United States Patent
Wang et al.

(10) Patent No.: US 9,451,277 B2
(45) Date of Patent: Sep. 20, 2016

(54) RESTRICTION OF PREDICTION UNITS IN B SLICES TO UNI-DIRECTIONAL INTER PREDICTION

(71) Applicants: Xianglin Wang, San Diego, CA (US); Vadim Seregin, San Diego, CA (US); Marta Karczewicz, San Diego, CA (US)

(72) Inventors: Xianglin Wang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 570 days.

(21) Appl. No.: 13/628,562

(22) Filed: Sep. 27, 2012

(65) Prior Publication Data

US 2013/0202037 A1 Aug. 8, 2013

Related U.S. Application Data

(60) Provisional application No. 61/596,597, filed on Feb. 8, 2012, provisional application No. 61/622,968, filed on Apr. 11, 2012.

(51) Int. Cl.
*H04N 7/32* (2006.01)
*H04N 19/52* (2014.01)
*H04N 19/159* (2014.01)
*H04N 19/176* (2014.01)
*H04N 19/109* (2014.01)
*H04N 19/577* (2014.01)

(52) U.S. Cl.
CPC ............ *H04N 19/52* (2014.11); *H04N 19/109* (2014.11); *H04N 19/159* (2014.11); *H04N 19/176* (2014.11); *H04N 19/577* (2014.11)

(58) Field of Classification Search
None
See application file for complete search history.

(56) References Cited

U.S. PATENT DOCUMENTS

| | | |
|---|---|---|
| 6,219,043 B1 | 4/2001 | Yogeshwar et al. |
| 7,233,621 B2 | 6/2007 | Jeon |
| 2004/0057520 A1 | 3/2004 | Sun |
| 2004/0234143 A1 | 11/2004 | Hagai et al. |
| 2007/0217512 A1 | 9/2007 | Matsuda et al. |
| 2008/0165855 A1 | 7/2008 | Wang et al. |
| 2009/0010553 A1* | 1/2009 | Sagawa ..................... 382/236 |
| 2009/0067505 A1 | 3/2009 | Tourapis et al. |
| 2011/0194609 A1 | 8/2011 | Rusert et al. |
| 2012/0027088 A1 | 2/2012 | Chien et al. |

(Continued)

OTHER PUBLICATIONS

Bross et al., "High efficiency video coding (HEVC) text specification draft 6," Joint Collaborative Team on Video Coding, JCTVC-H1003, Nov. 21-30, 2011, 259 pp.

(Continued)

*Primary Examiner* — Frederick Bailey
(74) *Attorney, Agent, or Firm* — Shumaker & Sieffert, P.A.

(57) ABSTRACT

A computing device determines whether a prediction unit (PU) in a B slice is restricted to uni-directional inter prediction. In addition, the computing device generates a merge candidate list for the PU and determines a selected merge candidate in the merge candidate list. If the PU is restricted to uni-directional inter prediction, the computing device generates a predictive video block for the PU based on no more than one reference block associated with motion information specified by the selected merge candidate. If the PU is not restricted to uni-directional inter prediction, the computing device generates the predictive video block for the PU based on one or more reference blocks associated with the motion information specified by the selected merge candidate.

24 Claims, 8 Drawing Sheets

(56) References Cited

U.S. PATENT DOCUMENTS

| | | | |
|---|---|---|---|
| 2012/0082242 A1 | 4/2012 | Narroschke et al. | |
| 2012/0195368 A1 | 8/2012 | Chien et al. | |
| 2012/0250773 A1 | 10/2012 | Chien et al. | |
| 2012/0263231 A1 | 10/2012 | Zhou | |
| 2012/0320968 A1 | 12/2012 | Zheng et al. | |
| 2013/0051454 A1* | 2/2013 | Sze et al. | 375/240.02 |
| 2013/0170549 A1* | 7/2013 | Li et al. | 375/240.16 |
| 2013/0195188 A1 | 8/2013 | Sugio | |
| 2013/0202038 A1 | 8/2013 | Seregin et al. | |
| 2013/0272409 A1 | 10/2013 | Seregin et al. | |
| 2014/0226719 A1 | 8/2014 | Yamamoto et al. | |

OTHER PUBLICATIONS

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

International Telecommunication Union, "Advanced video coding for generic audiovisual services," Standardization Sector of ITU, Jun. 2011, 674 pp.

Wiegand et al.,"WD1: Working Draft 1 of High-Efficiency Video Coding", Joint Collaborative Team on Video Coding, JCTVC-C403, Oct. 7-15, 2010, 137 pp.

Wiegand et al., "WD3: Working Draft 3 of High-Efficiency Video Coding," Joint Collaborative Team on Video Coding, JCTVC-E603, Mar. 16-23, 2011,193 pp.

Wiegand et al., "WD2: Working Draft 2 of High-Efficiency Video Coding", Joint Collaborative Team on Video Coding, JCTVC-D503, Jan. 20-28, 2011, 153 pp.

Britanak et al., "Discrete Cosine and Sine Transforms: General Properties, Fast Algorithms and Integer Approximations", Acadmemic Press, Apr. 2007, pp. 16-28.

Bross, et al., "CE9: Motion Vector Coding Test Report", JCT-VC Meeting; MPEG Meeting; Jan. 20, 2011-Jan. 28, 2011; Daegu; (Joint Collaborative Team on Video Coding of ISO/IEC JTC1/SC29/WG11 and ITU-T SG. 16); URL: http://wftpe.itu. int/av-arch/jc tvc-site/, No. JCTVC-D314, XP030008354, ISSN: 0000-0013, 10 pp.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v7, 290 pp.

Fukushima, et al., "AHG7: Bi-pred Restriction for Small PUs", JCT-VC Meeting; MPEG Meeting; Apr. 27, 2012-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-I0297, XP030112060, 12 pp.

Ikai, "AHG7: Controllable Memory Bandwidth Reduction with Bi-Pred to Uni-Pred Conversion", JCT-VC Meeting; MPEG Meeting; Feb. 1, 2012-Feb. 10, 2012; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-H0096, XP030111123, 8 pp.

International Preliminary Report on Patentability—PCT/US2013/025153—The International Bureau of WIPO Geneva, Switzerland, May 30, 2014, 12 pp.

International Search Report and Written Opinion—PCT/US2013/025153—ISA/EPO—May 8, 2013, 15 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Kim, et al., "MC Complexity Reduction for Bi-prediction", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G415, XP030110399, 6 pp.

Kim, et al., "Motion Compensation Complexity Reduction for Bi-Prediction", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16); URL: http://wftp3.itu.int/av-arch/jctvc-aite/, No. JCTVC-F356, XP030009379, 9 pp.

Kondo, et al., "AHG7: Modification of Merge Candidate Derivation to Reduce Mc Memory Bandwidth", JCT-VC Meeting; MPEG Meeting; Feb. 1, 2012-Feb. 10, 2012; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-H0221, XP030111248, 8 pp.

McCann, et al., "High Efficiency Video Coding (HEVC) Test Model 5 (HM 5) Encoder Description", JCT-VC Meeting; MPEG Meeting; Nov. 21, 2011-Nov. 30, 2011; Geneva; (Joint Collaborative Team on Video Coding (JCT-VC) of ISO/IEC JTC1/SC29/WG11 and ITU-T SG.16); URL:http://wftp3.itu.int/av-arch/jctvc-site/, No. JCTVC-G1102, XP030111031, 45 pp.

Zhou, "AHG7: A Combined Study on JCTVC-I0216 and JCTVC-I0107", JCT-VC Meeting; MPEG Meeting; Apr. 27, 2012-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-I0425, XP030112188, 6 pp.

Second Written Opinion from International Application No. PCT/US2013/025153, dated Jan. 27, 2014, 9 pp.

Response to Written Opinion dated May 8, 2013, from International Application No. PCT/US2013/025153, filed on Sep. 6, 2013, 29 pp.

Response to Second Written Opinion dated Jan. 27, 2014, from International Application No. PCT/US2013/025153, filed on Mar. 25, 2014, 23 pp.

International Preliminary Report on Patentability—PCT/US2013/025331—The International Bureau of WIPO Geneva, Switzerland, May 30, 2014, 13 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

International Search Report and Written Opinion—PCT/US2013/025331—ISA/EPO—May 8, 2013, 15 pp.

Second Written Opinion from International Application No. PCT/US2013/025331, dated Jan. 27, 2014, 7 pp.

Response to Written Opinion dated May 8, 2013, from International Application No. PCT/US2013/025331, filed on Sep. 24, 2013, 28 pp.

Response to Second Written Opinion dated Jan. 27, 2014, from International Application No. PCT/US2013/025331, filed on Mar. 20, 2014, 28 pp.

Ikai, "Bi-Prediction Restriction in Small PU", Joint Collaborative Team on Video Coding (JCT-VC) of ITU-T SG16 WP3 and ISO/IEC JTC1/SC29/WG11, 7th Meeting Geneva, CH, Doc. JCTVC-G307, Nov. 8, 2011, 5 pp.

Macinnis, "Complexity Limitations for High Definition", Joint Video Team (JVT) of ISO/IEC MPEG & ITU-T VCEG (ISO/IEC JTC1/SC29/WG11 and ITU-T SG16 Q.6), 4th Meeting Klagenfurt, Austria, Doc. JVT-D134M, Jul. 18, 2002, 3 pp.

U.S. Appl. No. 14/695,941, filed by Seregin, Vadim, et al., on Apr. 24, 2015.

Bross et al., "High efficiency video coding (HEVC) text specification draft 9," 11th Meeting: Shanghai, CN, Nov. 2, 2012, JCTVC-K1003_v7, 290 pp.

Chen et al; "Size-controllable memory reduction scheme of storing reference frames at H.264/AVC under I, P and B", Multimedia and

(56) References Cited

OTHER PUBLICATIONS

Expo (ICME), 2010 IEEE International Conference on, IEEE, Piscataway, NJ, USA, Jul. 19, 2010; XP031761415, pp. 802-807.
Ho, et al., "Advanced Video Coding Techniques for Smart Phones," 2012 International Conference on Embedded Systems and Intelligent Technology, Jan. 27-29, 2012, pp. 112-113.
Laroche, et al., "RD Optimized Coding for Motion Vector Predictor Selection", IEEE Transaction on Circuits and Systems for Video Technology, IEEE Service Center, Piscataway, NJ, US, vol. 18 (9), Sep. 2008, XP011231739, ISSN: 1051-8215, pp. 1247-1257.
Manoranjan et al. "McFIS in Hierarchical Bipredictive Pictures-Based Video Coding for Referencing the Stable Area in a Scene", Dec. 2011 18th IEEE International Conference on Image Processing, pp. 3521-3524.
Manoranjan, et al., "Video coding using the most common frame in scene", Acoustics Speech and Signal Processing (ICASSP), 2010 IEEE International Conference on, IEEE, Piscataway, NJ, USA, Mar. 2010; XP031697008, ISBN; 978-1-4244-4295-9; pp. 734-737.
Bross et al., "High Efficiency Video Coding (HEVC) Text Specification Draft 7", Draft of HEVC, Joint Collaborative Team on Video Coding (JCT-VC) of ITU-T SG16 WP3 and ISO/IEC JTC1/SC29/WG11, 9th Meeting, Geneva, Apr. 27-May 7, 2012, JCTVC-I1003_d5, 294 pp. [uploaded in parts].

\* cited by examiner

RESTRICTION OF PREDICTION UNITS IN B SLICES TO UNI-DIRECTIONAL INTER PREDICTION

This application claims the benefit of U.S. Provisional Patent Application No. 61/596,597, filed Feb. 8, 2012, and U.S. Provisional Patent Application No. 61/622,968, filed Apr. 11, 2012, the entire content of each of which are incorporated here by reference.

TECHNICAL FIELD

This disclosure relates to video coding and, in particular, to inter prediction in video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive video block for a block to be coded. Residual data represents pixel differences between the original block to be coded and the predictive video block. An inter-coded block is encoded according to a motion vector that points to a block of reference samples forming the predictive video block, and the residual data indicating the difference between the coded block and the predictive video block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for inter prediction in a video coding process. A video coder determines whether a prediction unit (PU) in a B slice is restricted to uni-directional inter prediction. In addition, the video coder generates a merge candidate list for the PU and determines a selected merge candidate in the merge candidate list. If the PU is restricted to uni-directional inter prediction, the video coder generates a predictive video block for the PU based on no more than one reference block associated with motion information specified by the selected merge candidate. If the PU is not restricted to uni-directional inter prediction, the video coder generates the predictive video block for the PU based on one or more reference blocks associated with the motion information specified by the selected merge candidate.

In one aspect, this disclosure describes a method for coding video data. The method comprises determining whether a PU in a B slice is restricted to uni-directional inter prediction. The method also comprises generating a merge candidate list for the PU. In addition, the method comprises determining a selected merge candidate in the merge candidate list. In addition, the method comprises, if the PU is restricted to uni-directional inter prediction, generating a predictive video block for the PU based on no more than one reference block associated with motion information specified by the selected merge candidate. The method also comprises if the PU is not restricted to uni-directional inter prediction, generating the predictive video block for the PU based on one or more reference blocks associated with the motion information specified by the selected merge candidate.

In another aspect, this disclosure describes a video coding device that comprises one or more processors configured to determine whether a PU in a B slice is restricted to uni-directional inter prediction. The one or more processors are also configured to generate a merge candidate list for the PU and determine a selected merge candidate in the merge candidate list. The one or more processors are configured such that if the PU is restricted to uni-directional inter prediction, the one or more processors generate a predictive video block for the PU based on no more than one reference block associated with motion information specified by the selected merge candidate. Furthermore, the one or more processors are configured such that if the PU is not restricted to uni-directional inter prediction, the one or more processors generate the predictive video block for the PU based on one or more reference blocks associated with the motion information specified by the selected merge candidate.

In another aspect, this disclosure describes a video coding device comprising means for determining whether a PU in a B slice is restricted to uni-directional inter prediction. The video coding device also comprises means for generating a merge candidate list for the PU. In addition, the video coding device comprises means for determining a selected merge candidate in the merge candidate list. The video coding device also comprises means for generating, if the PU is restricted to uni-directional inter prediction, a predictive video block for the PU based on no more than one reference block associated with motion information specified by the selected merge candidate. The video coding device also comprises means for generating, if the PU is not restricted to uni-directional inter prediction, the predictive video block for the PU based on one or more reference blocks associated with the motion information specified by the selected merge candidate.

In another aspect, this disclosure describes a computer program product that comprises one or more computer readable storage media that store instructions that, when executed, configure one or more processors to determine whether a PU in a B slice is restricted to uni-directional inter prediction. The instructions also configure the one or more processors to generate a merge candidate list for the PU and determine a selected merge candidate in the merge candidate list. If the PU is restricted to uni-directional inter prediction, the instructions configure the one or more processors to generate a predictive video block for the PU based on no more than one reference block associated with motion information specified by the selected merge candidate. If the PU is not restricted to uni-directional inter prediction, the instructions configure the one or more processors to generate the predictive video block for the PU based on one or more reference blocks associated with the motion information specified by the selected merge candidate.

The details of one or more examples are set forth in the accompanying drawings and the description below. Other features, objects, and advantages will be apparent from the description and drawings, and from the claims.

DETAILED DESCRIPTION

Figure 1:
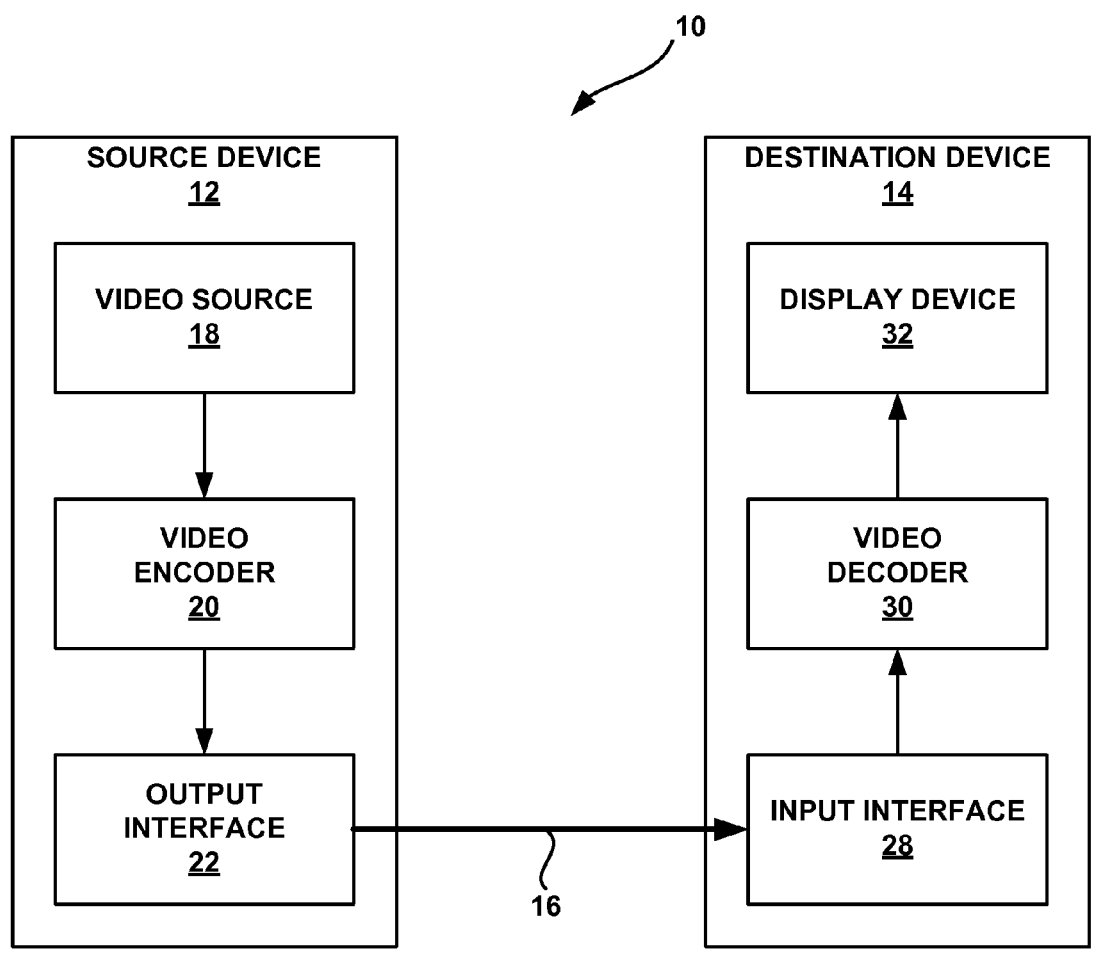
FIG. 1 is a block diagram illustrating an example video coding system that may utilize the techniques described in this disclosure.

As described below, a picture may be divided into one or more slices. Each of the slices may include an integer number of coding units (CUs). Each CU may have one or more prediction units (PUs). Slices may be I slices, P slices, or B slices. In an I slice, all PUs are intra predicted. A video encoder may perform intra prediction or uni-directional inter prediction on PUs in P slices. When the video encoder performs uni-directional inter prediction on a PU in a P slice, the video encoder may identify or synthesize a reference sample in a reference picture listed in a first list of reference pictures ("list 0"). The reference block may be a block of reference samples within the reference picture. The reference samples may correspond to actual pixels in a reference block, or pixels that are synthesized, e.g., by interpolation using actual pixels. The video encoder may then generate a predictive video block for the PU based on the reference block for the PU.

The video encoder may perform list 0 uni-directional inter prediction, list 1 uni-directional inter prediction, or bi-directional inter prediction on PUs in B-slices. When the video encoder performs list 0 uni-directional inter prediction on a PU, the video encoder may identify a reference block in a reference picture listed in list 0 or synthesize a reference block based on reference samples in a reference picture listed in list 0. The video encoder may then generate the predictive video block for the PU based on the reference block. When the video encoder performs list 1 uni-directional inter prediction on a PU, the video encoder may identify a reference block in a reference picture listed in a second reference picture list ("list 1") or may synthesize a reference block based on reference samples in a reference picture listed in list 1. The video encoder may then generate the predictive video block for the PU based on the reference block. When the video encoder performs bi-directional inter prediction on a PU, the video encoder may identify a reference block in a reference picture listed in list 0 or synthesize a reference block based on reference samples in a reference picture listed in list 0. In addition, when the video encoder performs bi-directional inter prediction on the PU, the video encoder may identify a reference block in a reference picture listed in list 1 or synthesize a reference block based on reference samples in a reference picture listed in list 1. The video encoder may then generate the predictive video block for the PU based on the two reference blocks.

The video encoder may signal motion information of a PU to enable a video decoder to identify or synthesize the reference block or reference blocks that the video encoder used to generate the predictive video block for the PU. The motion information of the PU may include one or more motion vectors, reference picture indexes, and flags to indicate whether inter prediction is based on list 0 and/or list 1. In some instances, the video encoder may signal the motion information of the PU using merge mode. When the video encoder signals the motion information of the PU using merge mode, the video encoder may generate a merge candidate list for the PU. The merge candidate list may include a plurality of merge candidates, each of which specifies a set of motion information.

A merge candidate may be a uni-directional merge candidate if the merge candidate specifies motion information that identifies a single location in a reference picture listed in either list 0 or list 1. A reference block may be associated with a set of motion information if the samples in the reference block are determined based on samples at a location identified by the motion information in a reference picture identified by the motion information. For instance, a reference block may be associated with a set of motion information if the samples in the reference block are the same as the samples in a video block at a location identified by the motion information in a reference picture identified by the motion information. A reference block may also be associated with a set of motion information if the samples in the reference block are synthesized (e.g., interpolated) from the samples in a video block at a location identified by the motion information in a reference frame identified by the motion information.

A merge candidate may be a bi-directional merge candidate if the merge candidate specifies motion information that identifies a location in a reference picture listed in list 0 and a location in a reference picture listed in list 1. The video encoder may generate the motion information specified by the merge candidates based on motion information of PUs that spatially neighbor the current PU and/or a co-located PU in a different picture. After generating the merge list for the current PU, the video encoder may select one of the merge candidates in the merge candidate list and signal a position within the merge candidate list of the selected merge candidate. The video decoder may determine the motion information of the current PU based on the motion information specified by the selected merge candidate.

In terms of operations and required memory bandwidth, generating a predictive video block for a PU based on two reference blocks may be more complex than generating the predictive video block for the PU based on a single reference block. The complexity associated with generating predictive video blocks based on two reference blocks may increase as the number of bi-directionally inter predicted PUs in a B slice increases. This may be especially true when the number of small bi-directionally inter predicted PUs increases. Accordingly, it may be advantageous to restrict some PUs in B slices to uni-directional inter prediction.

The video encoder may restrict a PU in a B slice to uni-directional inter prediction by only selecting uni-directional merge candidates from the merge candidate list for the PU. However, in some instances, the merge candidate list may not include any uni-directional merge candidates. In such instances, the video encoder may be unable to signal the motion information of the PU using merge mode. This may decrease coding performance. Furthermore, even if the merge candidate list includes at least one uni-directional merge candidate, coding efficiency may be diminished if the reference blocks associated with the motion information specified by the uni-directional merge candidates are not sufficiently similar to the video block associated with the PU.

In accordance with the techniques of this disclosure, a video coder (e.g., a video encoder or a video decoder) may determine whether a PU in a B slice is restricted to uni-directional inter prediction. For example, the video coder may determine that a PU is restricted to uni-directional inter prediction if a size characteristic of the PU is less than a particular threshold. The size characteristic of the PU may be a characteristic of a size of a video block associated with the PU, such as a height, width, diagonal length, etc. of the video block associated with the PU. In addition, the video coder may generate a merge candidate list for the PU and determine a selected merge candidate in the merge candidate list. If the PU is restricted to uni-directional inter prediction, the video coder may generate the predictive video block for the PU based on no more than one reference block associated with the motion information specified by the selected merge candidate. If the PU is not restricted to uni-directional inter prediction, the video coder may generate the predictive video block for the PU based on one or more reference blocks associated with the motion information specified by the selected merge candidate. By restricting some PUs to uni-directional inter prediction in this way, the video coder may reduce complexity associated with generating predictive video blocks based on multiple reference blocks. This may increase the speed at which the video coder is able to code video data and may reduce data bandwidth requirements.

For ease of explanation, this disclosure may describe locations or video blocks as having various spatial relationships with CUs or PUs. Such description may be interpreted to mean that the locations or video blocks have the various spatial relationships to the video blocks associated with the CUs or PUs. Furthermore, this disclosure may refer to a PU that a video coder is currently coding as the current PU. This disclosure may refer to a CU that a video coder is currently coding as the current CU. This disclosure may refer to a picture that a video coder is currently coding as the current picture.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1 is a block diagram that illustrates an example video coding system 10 that may utilize the techniques of this disclosure. As used described herein, the term "video coder" refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives. Destination device 14 may access the encoded video data through a standard data connection, including an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). A recent draft of the upcoming HEVC standard, referred to as "HEVC Working Draft 7" or "WD7," is described in document JCTVC-I1003_d54, Bross et al., "High efficiency video coding (HEVC) text specification draft 7," Joint Collaborative Team on Video Coding (JCT-VC) of ITU-T SG16 WP3 and ISO/IEC JTC1/SC29/WG11, 9th Meeting: Geneva, Switzerland, May, 2012, which, as of Jul. 19, 2012, is downloadable from: http://phenix.int-evry.fr/jct/doc_end_user/documents/9_Geneva/wg11/JCTVC-I1003-v6.zip, the entire content of which is incorporated herein by reference. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard or technique. Other examples of video compression standards and techniques include MPEG-2, ITU-T H.263 and proprietary or open source compression formats such as VP8 and related formats.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., in a storage system) prior to being received and decoded by video decoder 30. Thus, the term "signaling" may generally refer to the communication of syntax or other data used to decode the compressed video data. Such communication may occur in real- or near-real-time. Alternately, such communication may occur over a span of time, such as might occur when storing syntax elements to a medium in an encoded bitstream at the time of encoding, which then may be retrieved by a decoding device at any time after being stored to this medium.

As mentioned briefly above, video encoder 20 encodes video data. The video data may comprise one or more pictures. Each of the pictures may be a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU) or a "coding treeblock." The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise an encoded representation of the treeblock.

When video encoder 20 generates a coded slice, video encoder 20 may perform encoding operations on (i.e., encode) the treeblocks (which in this case represent largest coding units) in the slice according to a raster scan order. In other words, video encoder 20 may encode the treeblocks of the slice in an order that proceeds from left to right across a topmost row of treeblocks in the slice, then proceeds from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater.

Video encoder 20 may perform encoding operations on (i.e., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below or to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predictive video block for each PU of the CU. The predictive video block of a PU may be a block of samples. Video encoder 20 may use intra prediction or inter prediction to generate the predictive video block for a PU.

When video encoder 20 uses intra prediction to generate the predictive video block of a PU, video encoder 20 may generate the predictive video block of the PU based on decoded samples of the picture associated with the PU. If video encoder 20 uses intra prediction to generate predictive video blocks of the PUs of a CU, the CU is an intra-predicted CU.

When video encoder 20 uses inter prediction to generate the predictive video block of the PU, video encoder 20 may generate the predictive video block of the PU based on decoded samples of one or more pictures other than the picture associated with the PU. If video encoder 20 uses inter prediction to generate predictive video blocks of the PUs of a CU, the CU is an inter-predicted CU.

Furthermore, when video encoder 20 uses inter prediction to generate a predictive video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predictive video block for the PU based on the reference blocks of the PU.

As discussed above, a slice may be an I slice, a P slice, or a B slice. In an I slice, all PUs are intra predicted. In P slices and B slices, PUs may be intra predicted or inter predicted. When video encoder 20 performs inter prediction on a PU in a P slice, video encoder 20 may generate motion information that identifies a location in a single reference picture. In other words, the PU may be uni-directionally inter predicted. The motion information may include a reference picture index and a motion vector. The reference picture index may indicate a position in a first reference picture list ("list 0") of a reference picture. The motion vector may indicate a spatial displacement between the video block associated with the PU and a reference block within the reference picture. A video coder, such as video encoder 20 or video decoder 30, may subsequently generate the predictive video block for the PU based on the single reference block associated with the motion information of the PU. For instance, the video coder may generate the predictive video block for the PU such that the predictive video block matches the reference block.

A PU in a B slice may be uni-directionally inter predicted based on list 0, uni-directionally inter predicted based on a second reference picture list ("list 1"), or bi-directionally inter-predicted. If a PU in a B slice is uni-directionally inter predicted based on list 0, the motion information of the PU may include a list 0 reference picture index and a list 0 motion vector. The list 0 reference picture index may identify a reference picture by indicating a position in list 0 of the reference picture. The list 0 motion vector may indicate a spatial displacement between the video block associated with the PU and a reference block within the reference picture. Video encoder 20 may generate the predictive video block for the PU based on the reference block associated with the list 0 motion vector. In other words, video encoder 20 may generate the predictive video block for the PU based on a block of reference samples identified by the list 0 motion vector or may generate the predictive video block for the PU based on a block of reference samples synthesized (e.g., interpolated) from the block of reference samples identified by the list 0 motion vector.

If a PU in a B slice is uni-directionally inter predicted based on list 1, the motion information of the PU may include a list 1 reference picture index and a list 1 motion vector. The list 1 reference picture index may identify a reference picture by indicating a position in list 1 of the reference picture. The list 1 motion vector may indicate a spatial displacement between the PU and a reference block within the reference picture. Video encoder 20 may generate the predictive video block for the PU based on a block of reference samples associated with the list 1 motion vector. For example, video encoder 20 may generate the predictive video block for the PU based on a block of reference samples identified by the list 1 motion vector or may generate the predictive video block for the PU based on a block of reference samples synthesized (e.g., interpolated) from the block of reference samples identified by the list 1 motion vector.

If a PU in a B slice is bi-directionally inter predicted, the motion information of the PU may include a list 0 reference picture index, a list 0 motion vector, a list 1 reference picture index, and a list 1 motion vector. In some instances, the list 0 and list 1 reference picture indexes may identify the same picture. Video encoder 20 may generate the predictive video block for the PU based on the reference blocks associated with the list 0 and list 1 motion vectors. In some examples, video encoder 20 may generate the predictive video block for the PU by interpolating the predictive video block from samples in a reference block associated with the list 0 motion vector and samples in a reference block associated with the list 1 motion vector.

After video encoder 20 generates predictive video blocks for one or more PUs of a CU, video encoder 20 may generate residual data for the CU based on the predictive video blocks for the PUs of the CU. The residual data for the CU may indicate differences between samples in the predictive video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (i.e., residual video blocks) associated with transform units (TUs) of the CU. Each TU of a CU may be associated with a different residual video block.

Video coder 20 may apply one or more transforms to residual video blocks associated with the TUs to generate transform coefficient blocks (i.e., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, supplemental enhancement information (SEI), an access unit delimeter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predictive video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predictive video blocks and reconstructing the residual video blocks, video decoder 30 may reconstruct the video block of the CU based on the predictive video blocks and the residual video blocks. In this way, video decoder 30 may reconstruct the video blocks of CUs based on the syntax elements in the bitstream.

As described above, video encoder 20 may use inter prediction to generate predictive video blocks associated with motion information for the PUs of a CU. In many instances, the motion information of a given PU is likely to be the same or similar to the motion information of one or more nearby PUs (i.e., PUs whose video blocks are spatially or temporally nearby to the video block of the given PU). Because nearby PUs frequently have similar motion information, video encoder 20 may encode the motion information of the given PU with reference to the motion information of one or more nearby PUs. Encoding the motion information of the given PU with reference to the motion information of the one or more nearby PUs may reduce the number of bits required in the bitstream to indicate the motion information of the given PU.

Video encoder 20 may encode the motion information of a given PU with reference to the motion information of one or more nearby PUs in various ways. For example, video encoder 20 may encode the motion information of the given PU using merge mode or advanced motion vector prediction (AMVP) mode. To encode the motion information of a PU using merge mode, video encoder 20 may generate a merge candidate list for the PU. The merge candidate list may include one or more merge candidates. Each of the merge candidates specifies a set of motion information. Video encoder 20 may generate one or more of the merge candidates based on the motion information specified by PUs that spatially neighbor the PU in the same picture, which may be referred to as spatial merge candidates, or based on a co-located PU in another picture, which may be referred to as a temporal merge candidate. If the motion information specified by a merge candidate is associated with two reference blocks, the merge candidate may be referred to herein as a bi-directional merge candidate or a merge candidate that is bi-directional. Otherwise, if the motion information specified by a merge candidate is associated with only a single reference block, the merge candidate may be referred to herein as a uni-directional merge candidate or a merge candidate that is uni-directional. Video encoder 20 may select one of the merge candidates from the merge candidate list and signal a candidate index value for the PU. The candidate index value may indicate a position in the merge candidate list of the selected merge candidate.

When video encoder 20 encodes the motion information of a PU using merge mode, video decoder 30 may generate the same merge candidate list for the PU as video encoder 20 generated for the PU. Video decoder 30 may then determine, based on the candidate index value for the PU, which one of the merge candidates in the merge candidate list was selected by video encoder 20. Video decoder 30 may then adopt the motion information specified by the selected merge candidate as the motion information of the PU. The motion information specified by the selected candidate may include one or more motion vectors and one or more reference picture indexes.

When video encoder 20 signals the motion information of a PU using AMVP, video encoder 20 may generate a list 0 MV predictor candidate list for the PU if the PU is uni-directionally inter predicted based on list 0 or if the PU is bi-directionally inter predicted based on reference pictures in list 0 and list 1. The list 0 MV predictor candidate list may include one or more MV predictor candidates. Each of the MV predictor candidates specifies a set of motion information. Video encoder 20 may select a list 0 MV predictor candidate from the list 0 MV predictor candidate list. Video encoder 20 may signal a list 0 MV predictor flag that indicates a position in the list 0 MV predictor candidate list of the selected list 0 MV predictor candidate. The list 0 MV predictor flag may be denoted as "mvp_10_flag."

In addition, when video encoder 20 signals the motion information of a PU using AMVP, video encoder 20 may generate a list 1 MV predictor candidate list for the PU if the PU is uni-directionally inter predicted based on list 1 or if the PU is bi-directionally inter predicted. The list 1 MV predictor candidate list may include one or more MV predictor candidates. Each of the MV predictor candidates specifies a set of motion information. Video encoder 20 may then select a list 1 MV predictor candidate from the list 1 MV predictor candidate list. Video encoder 20 may signal a list 1 MV predictor flag that indicates a position in the list 1 MV predictor candidate list of the selected list 1 MV predictor candidate. The list 1 MV predictor flag may be denoted as "mvp_l1_flag."

In addition, when video encoder 20 encodes the motion information of a PU using AMVP, video encoder 20 may calculate a list 0 motion vector difference (MVD) for the PU if the PU is uni-directionally inter predicted based on list 0 or if the PU is bi-directionally inter predicted. The list 0 MVD indicates a difference between a list 0 motion vector of the PU and a list 0 motion vector specified by the selected list 0 MV predictor candidate. In addition, video encoder 20 may output a list 1 MVD for the PU if the PU is uni-directionally predicted based on list 1 or if the PU is bi-directionally inter predicted. The list 1 MVD indicates a difference between the list 1 motion vector of the PU and a list 1 motion vector specified by the selected list 1 MV predictor candidate. Video encoder 20 may signal the list 0 MVD and/or the list 1 MVD.

When video encoder 20 signals the motion information of a PU using AMVP mode, video decoder 30 may independently generate the same list 0 and/or list 1 MV predictor candidate lists generated by video encoder 20. In other examples, video encoder 20 may encode syntax elements that specify the list 0 and list 1 MV predictor candidate lists. If the PU is uni-directionally inter predicted based on list 0 or if the PU is bi-directionally inter predicted, video decoder 30 may determine the selected list 0 MV predictor candidate from the list 0 MV predictor candidate list. Video decoder 30 may then determine a list 0 motion vector of the PU based on the selected list 0 MV predictor candidate and the list 0 MVD for the PU. For instance, video decoder 30 may determine the list 0 motion vector of the PU by adding the list 0 motion vector specified by the selected list 0 MV predictor candidate and the list 0 MVD. If the PU is uni-directionally inter predicted based on list 1 or if the PU is bi-directionally inter predicted, video decoder 30 may determine the selected list 1 MV predictor candidate from the list 1 MV predictor candidate list. Video decoder 30 may then determine a list 1 motion vector of the PU based on a list 1 motion vector specified by the selected list 1 MV candidate and the list 1 MVD. For instance, video decoder 30 may determine the list 1 motion vector of the PU by adding the list 1 motion vector specified by the selected list 1 MV candidate and the list 1 MVD.

As discussed briefly above, when video encoder 20 performs inter prediction on a PU in a B slice, video encoder 20 may generate motion information associated with one or two reference blocks for the PU. A video coder, such as video encoder 20 or video decoder 30, may then generate the predictive video block for the PU based on the reference blocks associated with the motion information of the PU. In order to generate the predictive video block based on the two reference blocks, the video coder may retrieve both of the reference blocks from memory. Because memory bandwidth (i.e., the rate at which data can be transferred from memory) may be limited, it may take longer to retrieve the two reference blocks from memory than it would take to retrieve a single reference block from memory. Hence, if a B slice includes many small bi-directionally inter predicted PUs, the additional time required to retrieve two reference blocks for each of the PUs may diminish the speed at which the video coder is able to generate the predictive video blocks for PUs in the B slice.

In accordance with various examples of the techniques of this disclosure, a video coder, such as video encoder 20 or video decoder 30, may determine whether a PU in a B slice is restricted to uni-directional inter prediction. In some examples, the video coder may determine that the PU is restricted to uni-directional inter prediction based on a size characteristic of the PU or a parameter. In addition, the video coder may generate a merge candidate list for the PU and determine a selected merge candidate in the merge candidate list. If the PU is restricted to uni-directional inter prediction, the video coder may generate the predictive video block for the PU based on no more than one reference block associated with motion information specified by the selected merge candidate. On the other hand, if the PU is not restricted to uni-directional inter prediction, the video coder may generate the predictive video block for the PU based on one or more reference blocks associated with the motion information specified by the selected merge candidate. Because the video coder transfers less data from memory when generating a predictive video block based on a single reference block than when generating a predictive video block based on two reference blocks, restricting certain PUs in B slices to uni-directional inter prediction by video encoders and decoders may increase the speed at which the video encoders and decoders are able to generate the predictive video blocks for the PUs in the B slices.

The video coder, i.e., the video encoder or video decoder, may determine that a PU in a B slice is restricted to uni-directional inter prediction based on various criteria. For example, the video coder may determine that a PU in a B slice is restricted to uni-directional inter prediction if a size characteristic of the PU is below a particular threshold. In this example, the video coder may determine that the PU is not restricted to uni-directional inter prediction if the size characteristic of the PU is not below the threshold. For instance, in this example, the video coder may determine that the PU is restricted to uni-directional inter prediction if a height or a width of the video block associated with the PU is below the threshold. For example, if a height and/or a width of the video block associated with the PU is less than N (e.g., N=8) pixels, the video coder may determine that the PU is restricted to uni-directional inter prediction.

In another example, the video coder may determine that a PU in a B slice is restricted to uni-directional inter prediction if a first dimension of a video block associated with the PU is less than a threshold and a second dimension of the video block associated with the PU is less than or equal to the threshold. A dimension of a video block may be a width or a height of the video block. For instance, if the threshold is equal to 8, the video coder may determine that the PU is not restricted to uni-directional inter prediction if a width of the video block is equal to 4, but the height of the video block is equal to 16. However, if the threshold is equal to 8, the video coder may determine that the PU is restricted to uni-directional inter prediction if a width of the video block is equal to 4 and the height of the video block is equal to 8.

In another example, the video coder may determine that a PU in a B slice is restricted to uni-directional inter prediction if a first dimension of a video block associated with the PU is less than a first threshold and a second dimension of the video block associated with the PU is less than a second threshold. For instance, the video coder may determine that the PU is restricted to uni-directional inter prediction if a width of the video block is less than 8 and the height of the video block is less than 16. In some instances, the first threshold may be the same as the second threshold.

In another example, the video coder may determine that the PU is restricted to uni-directional inter prediction if a size characteristic of a CU associated with the PU (e.g., the current CU) is equal to a particular size and a size characteristic of the PU is below a threshold. In this example, the video coder may determine that the PU is not restricted to uni-directional inter prediction if the size characteristic of the CU is not equal to the particular size or the size characteristic of the PU is not below the threshold. In this example, the particular size may be equal to N (e.g., N=8) pixels and the threshold may also be equal to N (e.g., N=8) pixels. In this example, for a CU with a size of 8×8, any PU of the CU that has a size smaller than 8×8 may be prohibited from bi-directional inter prediction.

In another example, the video coder may determine that a PU in a B slice is restricted to uni-directional inter prediction if a parameter indicates that PUs in the B slice are to be restricted to uni-directional inter prediction.

The video coder may restrict a PU in a B slice to uni-directional inter prediction in various ways. For example, the video coder may ignore one of the reference blocks associated with the PU's motion information and generate the PU's predictive video block based on the one of the reference blocks associated with the PU's motion information. For instance, the video coder may generate a merge candidate list and, if the selected merge candidate is a bi-directional merge candidate, the video coder may generate the predictive video block for the PU based on the reference block associated with the selected merge candidate's list 0 reference picture index and the selected merge candidate's list 0 motion vector. In a similar example, the video coder may generate the predictive video block for the PU based on the reference block associated with the selected merge candidate's list 1 reference picture index and the selected merge candidate's list 1 motion vector.

In another example of how the video coder may restrict a PU in a B slice to uni-directional inter prediction, the video coder may include uni-directional merge candidates in a merge candidate list for the PU without including bi-directional merge candidates in the merge candidate list for the PU. The video coder does not, in this example, convert the bi-directional merge candidates into uni-directional merge candidates. In this example, the video coder may include artificial uni-directional merge candidates in the merge candidate list if the number of available uni-directional merge candidates is insufficient to fill the merge candidate list. An artificial merge candidate may be a merge candidate that is generated based on the motion information of one or more PUs, but that does not specify the motion information of the one or more PUs.

In another example of how the video coder may restrict a PU in a B slice to uni-directional inter prediction, the video coder may convert bi-directional merge candidates into one or more uni-directional merge candidates and include the one or more uni-directional merge candidates in the merge candidate list. In some such examples, the video coder may convert the bi-directional merge candidate into a single uni-directional merge candidate associated with a reference picture in list 0 or a reference picture in list 1. In some such cases, whenever the video coder converts bi-directional merge candidates to uni-directional merge candidates, the uni-directional merge candidates are associated with reference pictures in a particular reference list. For example, the video coder may only convert the bi-directional merge candidate into a single uni-directional merge candidate associated with a reference picture in list 0. Alternatively, the video coder may only convert the bi-directional merge candidate into a single uni-directional merge candidate associated with a reference picture in list 1. In other such examples, the video coder may convert the bi-directional merge candidate into two uni-directional merge candidates, one of which is associated with a reference picture in list 0 and the other of which is associated with a reference picture in list 1. Hence, in some examples, after generating the merge candidate list, the video coder may convert a bi-directional merge candidate in the merge candidate list into a uni-directional merge candidate and include the uni-directional merge candidate in the merge candidate list in place of the bi-directional merge candidate.

In some examples, the video coder may remove duplicate merge candidates from the merge candidate list before converting bi-directional merge candidates to uni-directional merge candidates. In other examples, the video coder may remove duplicate merge candidates from the merge candidate list after converting bi-directional merge candidates to uni-directional merge candidates.

When video encoder 20 encodes the motion information of a PU in a B slice using AMVP, video encoder 20 may generate, entropy encode, and output an inter prediction mode indicator for the PU. The inter prediction mode indicator may be denoted as "inter_pred_idc." The inter prediction mode indicator may indicate whether the PU is uni-directionally inter predicted based on list 0, uni-directionally inter predicted based on list 1, or is bi-directionally inter predicted. Video decoder 30 may use the inter prediction mode indicator when performing inter prediction on the PU. Because the inter prediction mode indicator has three possible values, the inter prediction mode indicator may conventionally be represented using two bits.

However, if a PU in a B slice is restricted to uni-directional inter prediction, the inter prediction mode indicator can have two possible values: uni-directional inter-prediction based on list 0 and uni-directional inter prediction based on list 1. Hence, in accordance with the techniques of this disclosure, if a PU in a B slice is restricted to uni-directional inter prediction, the inter prediction mode indicator may be represented using a single bit. Otherwise, if the PU is not restricted to uni-directional inter prediction, the inter prediction mode indicator may be represented using two bits. Representing the inter prediction mode indicator using a single bit when the PU is restricted to uni-directional inter prediction may increase coding efficiency.

Furthermore, different contexts may be used to entropy code the inter prediction mode indicator of a PU in a B slice if the PU is restricted to uni-directional inter prediction than if the PU is not restricted to uni-directional inter prediction. This may further increase coding efficiency.

Figure 2:
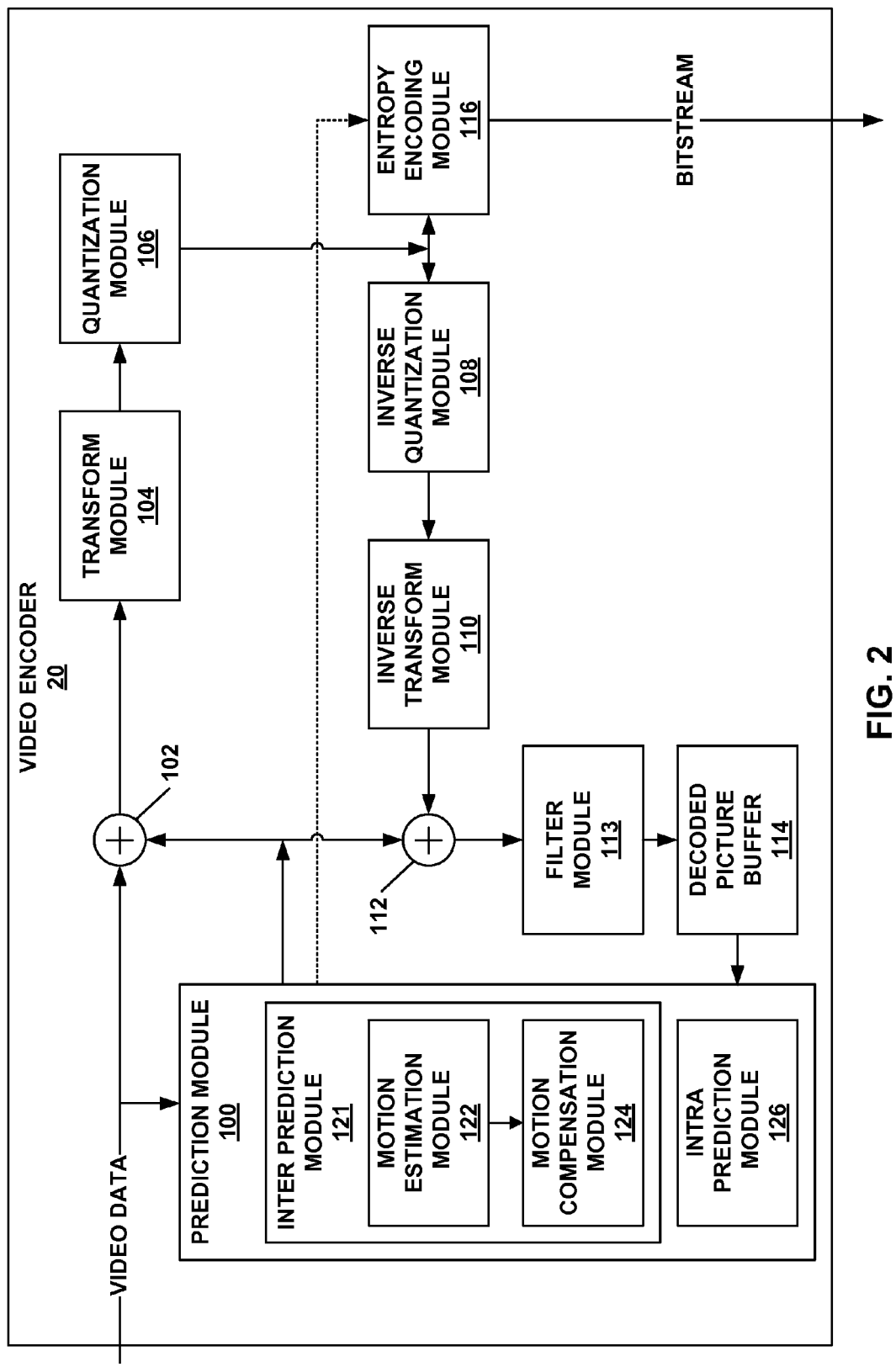
FIG. 2 is a block diagram illustrating an example video encoder that is configured to implement the techniques described in this disclosure.

FIG. 2 is a block diagram that illustrates an example video encoder 20 that is configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, a filter module 113, a decoded picture buffer 114, and an entropy encoding module 116. Prediction module 100 includes an inter prediction module 121, motion estimation module 122, a motion compensation module 124, and an intra prediction module 126. In other examples, video encoder 20 may include more, fewer, or different functional components. Furthermore, motion estimation module 122 and motion compensation module 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction module 100 may perform quadtree partitioning on the video block of the treeblock to divide the video block into progressively smaller video blocks. Each of the smaller video blocks may be associated with a different CU. For example, prediction module 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction module 100 may generate a hierarchical quadtree data structure for the treeblock. For example, a treeblock may correspond to a root node of the quadtree data structure. If prediction module 100 partitions the video block of the treeblock into four sub-blocks, the root node has four child nodes in the quadtree data structure. Each of the child nodes corresponds to a CU associated with one of the sub-blocks. If prediction module 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 may generate an encoded representation of the non-partitioned CU.

As part of performing an encoding operation on a CU, prediction module 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N for intra prediction, and symmetric PU sizes of 2N>2N, 2N×N, N>2N, N×N, or similar for inter prediction. Video encoder 20 and video decoder 30 may also support asymmetric partitioning for PU sizes of 2N×nU, 2N×nD, nL×2N, and nR×2N for inter prediction. In some examples, prediction module 100 may perform geometric partitioning to partition the video block of a CU among PUs of the CU along a boundary that does not meet the sides of the video block of the CU at right angles.

Inter prediction module 121 may perform inter prediction on each PU of the CU. Inter prediction may provide temporal compression. When inter prediction module 121 performs inter prediction on a PU, inter prediction module 121 may generate predictive data for the PU. The predictive data for the PU may include a predictive video block that corresponds to the PU and motion information for the PU. Motion estimation module 122 may generate the motion information for the PU. In some instances, motion estimation module 122 may use merge mode or AMVP mode to signal the motion information of the PU. Motion compensation module 124 may generate the predictive video block of the PU based on samples of one or more pictures other than the current picture (i.e., reference pictures).

Slices may be I slices, P slices, or B slices. Motion estimation module 122 and motion compensation module 124 may perform different operations for a PU of a CU depending on whether the PU is in an I slice, a P slice, or a B slice. In an I slice, all PUs are intra predicted. Hence, if the PU is in an I slice, motion estimation module 122 and motion compensation module 124 do not perform inter prediction on the PU.

If the PU is in a P slice, the picture containing the PU is associated with a list of reference pictures referred to as "list 0." In some examples, each reference picture listed in list 0 occurs before the current picture in display order. Each of the reference pictures in list 0 contains samples that may be used for inter prediction of other pictures. When motion estimation module 122 performs the motion estimation operation with regard to a PU in a P slice, motion estimation module 122 may search the reference pictures in list 0 for a reference block for the PU. The reference block of the PU may be a set of samples, e.g., a block of samples, that most closely corresponds to the samples in the video block of the PU. Motion estimation module 122 may use a variety of metrics to determine how closely a set of samples in a reference picture corresponds to the samples in the video block of a PU. For example, motion estimation module 122 may determine how closely a set of samples in a reference picture corresponds to the samples in the video block of a PU by sum of absolute difference (SAD), sum of square difference (SSD), or other difference metrics.

After identifying or synthesizing a reference block of a PU in a P slice, motion estimation module 122 may generate a reference picture index that indicates the reference picture in list 0 containing the reference block and a motion vector that indicates a spatial displacement between the PU and the reference block. Motion estimation module 122 may generate motion vectors to varying degrees of precision. For example, motion estimation module 122 may generate motion vectors at one-quarter sample precision, one-eighth sample precision, or other fractional sample precision. In the case of fractional sample precision, reference block values may be interpolated from integer-position sample values in the reference picture. Motion estimation module 122 may output the reference picture index and the motion vector as the motion information of the PU. Motion compensation module 124 may generate a predictive video block of the PU based on the reference block associated with the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1. In some examples, each reference picture listed in list 1 occurs after the current picture in display order.

Furthermore, if the PU is in a B slice, motion estimation module 122 may perform uni-directional inter prediction or bi-directional inter prediction for the PU. When motion estimation module 122 performs uni-directional inter prediction for the PU, motion estimation module 122 may search the reference pictures of list 0 or list 1 for a reference block for the PU. Motion estimation module 122 may then generate a reference picture index that indicates the reference picture in list 0 or list 1 that contains the reference block and a motion vector that indicates a spatial displacement between the PU and the reference block.

When motion estimation module 122 performs bi-directional inter prediction for a PU, motion estimation module 122 may search the reference pictures in list 0 for a reference block for the PU and may also search the reference pictures in list 1 for another reference block for the PU. Motion estimation module 122 may then generate reference picture indexes that indicate the reference pictures in list 0 and list 1 containing the reference blocks and motion vectors that indicate spatial displacements between the reference blocks and the PU. The motion information of the PU may include the reference picture indexes and the motion vectors of the PU. Motion compensation module 124 may generate the predictive video block of the PU based on the reference blocks indicated by the motion information of the PU.

Motion compensation module 124 may generate the predictive video block of the PU based on one or more reference blocks associated with the motion information of the PU. In accordance with the techniques of this disclosure, motion compensation module 124 may determine whether the PU is restricted to uni-directional inter prediction. In addition, motion compensation module 124 may generate a merge candidate list for the PU and determine a selected merge candidate in the merge candidate list. If the PU is restricted to uni-directional inter prediction, motion compensation module 124 may generate the predictive video block for the PU based on no more than one reference block associated with the motion information specified by the selected merge candidate. If the PU is not restricted to uni-directional inter prediction, motion compensation module 124 may generate the predictive video block for the PU based on one or more reference blocks associated with the motion information specified by the selected merge candidate.

As part of performing an encoding operation on a CU, intra prediction module 126 may perform intra prediction on PUs of the CU. Intra prediction may provide spatial compression. When intra prediction module 126 performs intra prediction on a PU, intra prediction module 126 may generate prediction data for the PU based on decoded samples of other PUs in the same picture. The prediction data for the PU may include a predictive video block and various syntax elements. Intra prediction module 126 may perform intra prediction on PUs in I slices, P slices, and B slices.

To perform intra prediction on a PU, intra prediction module 126 may use multiple intra prediction modes to generate multiple sets of prediction data for the PU. When intra prediction module 126 uses an intra prediction mode to generate a set of prediction data for the PU, intra prediction module 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction module 126 may use various numbers of intra prediction modes, e.g., 33 directional intra prediction modes. In some examples, the number of intra prediction modes may depend on the size of the PU.

Prediction module 100 may select the prediction data for a PU from among the prediction data generated by motion compensation module 124 for the PU or the prediction data generated by intra prediction module 126 for the PU. In some examples, prediction module 100 selects the prediction data for the PU based on rate/distortion metrics of the sets of prediction data.

If prediction module 100 selects prediction data generated by intra prediction module 126, prediction module 100 may signal the intra prediction mode that was used to generate the prediction data for the PUs, i.e., the selected intra prediction mode. Prediction module 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction module 100 may generate a syntax element to indicate that the selected intra prediction mode is the same as the intra prediction mode of the neighboring PU.

After prediction module 100 selects the prediction data for PUs of a CU, residual generation module 102 may generate residual data for the CU by subtracting the predictive video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predictive video blocks of the PUs of the CU and luminance components of samples in the original video block of the CU. In addition, the residual data of the CU may include residual video blocks that correspond to the differences between chrominance components of samples in the predictive video blocks of the PUs of the CU and the chrominance components of the samples in the original video block of the CU.

Prediction module 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform module 104 may generate one or more transform coefficient blocks for each TU of a CU by applying one or more transforms to a residual video block associated with the TU. Each of the transform coefficient blocks may be a 2D matrix of transform coefficients. Transform module 104 may apply various transforms to the residual video block associated with a TU. For example, transform module 104 may apply a discrete cosine transform (DCT), a directional transform, or a conceptually similar transform to the residual video block associated with a TU.

After transform module 104 generates a transform coefficient block associated with a TU, quantization module 106 may quantize the transform coefficients in the transform coefficient block. Quantization module 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization module 108 and inverse transform module 110 may apply inverse quantization and inverse transforms to the transform coefficient block, respectively, to reconstruct a residual video block from the transform coefficient block. Reconstruction module 112 may add the reconstructed residual video block to corresponding samples from one or more predictive video blocks generated by prediction module 100 to produce a reconstructed video block associated with a TU. By reconstructing video blocks for each TU of a CU in this way, video encoder 20 may reconstruct the video block of the CU.

After reconstruction module 112, represented as a summer, reconstructs the video block of a CU, filter module 113 may perform a deblocking operation to reduce blocking artifacts in the video block associated with the CU. After performing the one or more deblocking operations, filter module 113 may store the reconstructed video block of the CU in decoded picture buffer 114. Motion estimation module 122 and motion compensation module 124 may use a reference picture that contains the reconstructed video block to perform inter prediction on PUs of subsequent pictures. In addition, intra prediction module 126 may use reconstructed video blocks in decoded picture buffer 114 to perform intra prediction on other PUs in the same picture as the CU.

Entropy encoding module 116 may receive data from other functional components of video encoder 20. For example, entropy encoding module 116 may receive transform coefficient blocks from quantization module 106 and may receive syntax elements from prediction module 100. When entropy encoding module 116 receives the data, entropy encoding module 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding module 116 may output a bitstream that includes the entropy encoded data.

As part of performing an entropy encoding operation on data, entropy encoding module 116 may select a context model. If entropy encoding module 116 is performing a CABAC operation, the context model may indicate estimates of probabilities of particular bins having particular values. In the context of CABAC, the term "bin" is used to refer to a bit of a binarized version of a syntax element.

Figure 3:
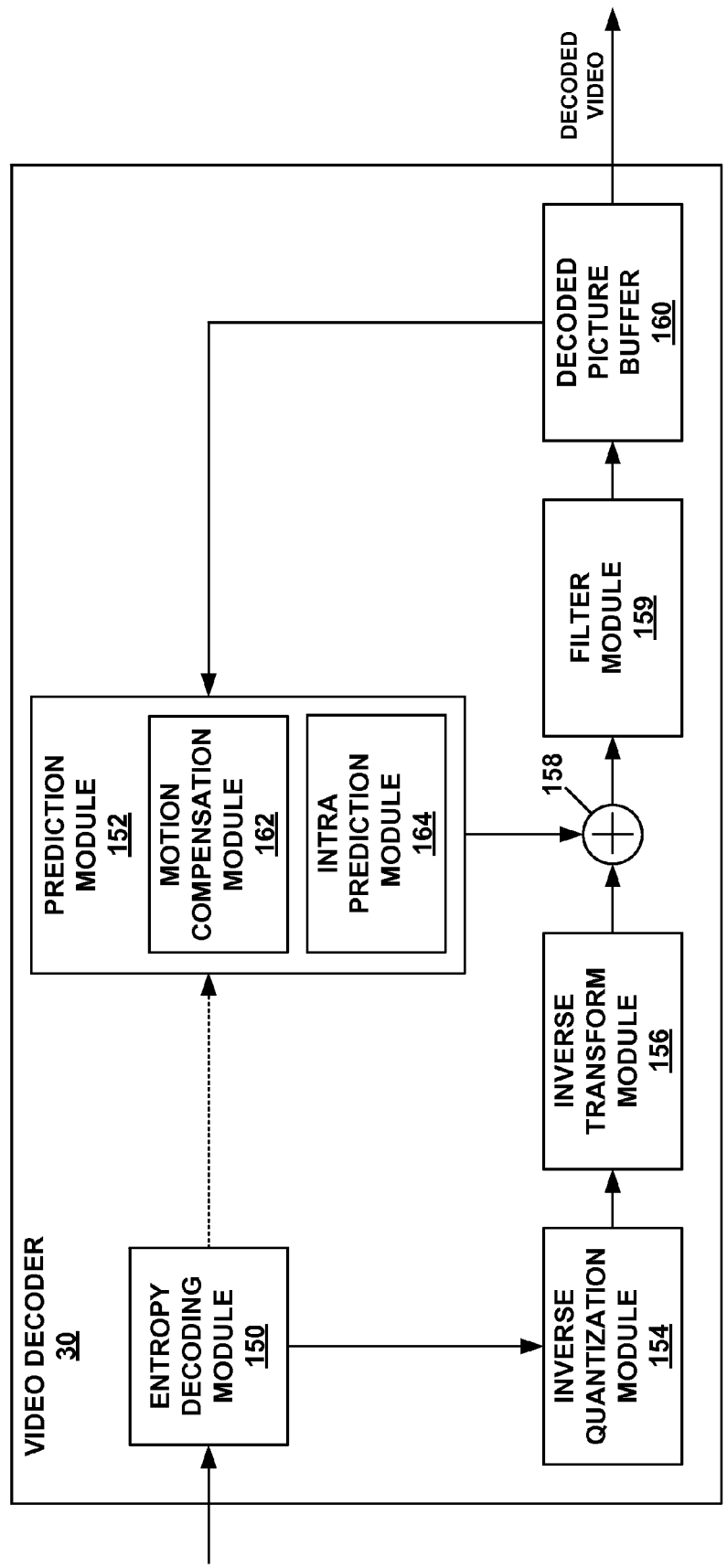
FIG. 3 is a block diagram illustrating an example video decoder that is configured to implement the techniques described in this disclosure.

FIG. 3 is a block diagram that illustrates an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes a plurality of functional components. The functional components of video decoder 30 include an entropy decoding module 150, a prediction module 152, an inverse quantization module 154, an inverse transform module 156, a reconstruction module 158, a filter module 159, and a decoded picture buffer 160. Prediction module 152 includes a motion compensation module 162 and an intra prediction module 164. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding module 150 may perform a parsing operation on the bitstream. As a result of performing the parsing operation on the bitstream, entropy decoding module 150 may extract syntax elements from the bitstream. As part of performing the parsing operation, entropy decoding module 150 may entropy decode entropy encoded syntax elements in the bitstream. Prediction module 152, inverse quantization module 154, inverse transform module 156, reconstruction module 158, and filter module 159 may perform a reconstruction operation that generates decoded video data based on the syntax elements extracted from the bitstream.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding module 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding module 150 may perform entropy decoding operations, such as CABAC decoding operations, on syntax elements in the coded slice header to recover the slice header.

As part of extracting the slice data from coded slice NAL units, entropy decoding module 150 may perform parsing operations that extract syntax elements from coded CUs in the slice data. The extracted syntax elements may include syntax elements associated with transform coefficient blocks. Entropy decoding module 150 may then perform CABAC decoding operations on some of the syntax elements.

After entropy decoding module 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization module 154 may inverse quantize, i.e., de-quantize, a transform coefficient block associated with the TU. Inverse quantization module 154 may inverse quantize the transform coefficient block in a manner similar to the inverse quantization processes proposed for HEVC or defined by the H.264 decoding standard. Inverse quantization module 154 may use a quantization parameter QP calculated by video encoder 20 for a CU of the transform coefficient block to determine a degree of quantization and, likewise, a degree of inverse quantization for inverse quantization module 154 to apply.

After inverse quantization module 154 inverse quantizes a transform coefficient block, inverse transform module 156 may generate a residual video block for the TU associated with the transform coefficient block. Inverse transform module 156 may apply an inverse transform to the transform coefficient block in order to generate the residual video block for the TU. For example, inverse transform module 156 may apply an inverse DCT, an inverse integer transform, an inverse Karhunen-Loeve transform (KLT), an inverse rotational transform, an inverse directional transform, or another inverse transform to the transform coefficient block.

In some examples, inverse transform module 156 may determine an inverse transform to apply to the transform coefficient block based on signaling from video encoder 20. In such examples, inverse transform module 156 may determine the inverse transform based on a signaled transform at the root node of a quadtree for a treeblock associated with the transform coefficient block. In other examples, inverse transform module 156 may infer the inverse transform from one or more coding characteristics, such as block size, coding mode, or the like. In some examples, inverse transform module 156 may apply a cascaded inverse transform.

If a PU is encoded in skip mode or motion information of the PU is encoded using merge mode, motion compensation module 162 may generate a merge candidate list for the PU. Motion compensation module 162 may then identify a selected merge candidate in the merge candidate list. After identifying the selected merge candidate in the merge candidate list, motion compensation module 162 may generate a predictive video block for the PU based on the one or more reference blocks associated with the motion information indicated by the selected merge candidate.

In accordance with the techniques of this disclosure, motion compensation module 162 may determine whether a PU is restricted to uni-directional inter prediction. Furthermore, motion compensation module 162 may generate a merge candidate list for the PU and determine a selected merge candidate in the merge candidate list. If the PU is restricted to uni-directional inter prediction, motion compensation module 162 may generate a predictive video block for the PU based on no more than one reference block associated with motion information specified by the selected merge candidate. Otherwise, if the PU is not restricted to uni-directional inter prediction, motion compensation module 162 may generate the predictive video block for the PU based on one or more reference blocks associated with the motion information specified by the selected merge candidate.

If motion information of a PU is encoded using AMVP mode, motion compensation module 162 may generate a list 0 MV predictor candidate list and/or a list 1 MV predictor candidate list. Motion compensation module 162 may then determine a selected list 0 MV predictor candidate and/or a selected list 1 MV predictor candidate. Next, motion compensation module 162 may determine a list 0 motion vector for the PU and/or a list 1 motion vector for the PU based on a list 0 MVD, a list 1 MVD, a list 0 motion vector specified by the selected list 0 MV predictor candidate, and/or a list 1 motion vector specified by the selected list 1 MV predictor candidate. Motion compensation module 162 may then generate a predictive video block for the PU based on reference blocks associated with the list 0 motion vector and a list 0 reference picture index and/or a list 1 motion vector and a list 1 reference picture index.

In some examples, motion compensation module 162 may refine the predictive video block of a PU by performing interpolation based on interpolation filters. Identifiers for interpolation filters to be used for motion compensation with sub-sample precision may be included in the syntax elements. Motion compensation module 162 may use the same interpolation filters used by video encoder 20 during generation of the predictive video block of the PU to calculate interpolated values for sub-integer samples of a reference block. Motion compensation module 162 may determine the interpolation filters used by video encoder 20 according to received syntax information and use the interpolation filters to produce the predictive video block.

If a PU is encoded using intra prediction, intra prediction module 164 may perform intra prediction to generate a predictive video block for the PU. For example, intra prediction module 164 may determine an intra prediction mode for the PU based on syntax elements in the bitstream. The bitstream may include syntax elements that intra prediction module 164 may use to determine the intra prediction mode of the PU.

In some instances, the syntax elements may indicate that intra prediction module 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction module 164 may then use the intra prediction mode to generate prediction data (e.g., predictive samples) for the PU based on the video blocks of spatially neighboring PUs.

Reconstruction module 158 may use the residual video blocks associated with TUs of a CU and the predictive video blocks of the PUs of the CU, i.e., either intra-prediction data or inter-prediction data, as applicable, to reconstruct the video block of the CU. In particular, reconstruction module 158 may add the residual data to the predictive data to reconstruct the coded video data. Thus, video decoder 30 may generate a predictive video block and a residual video block based on syntax elements in the bitstream and may generate a video block based on the predictive video block and the residual video block.

After reconstruction module 158 reconstructs the video block of the CU, filter module 159 may perform a deblocking operation to reduce blocking artifacts associated with the CU. After filter module 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Figure 4:
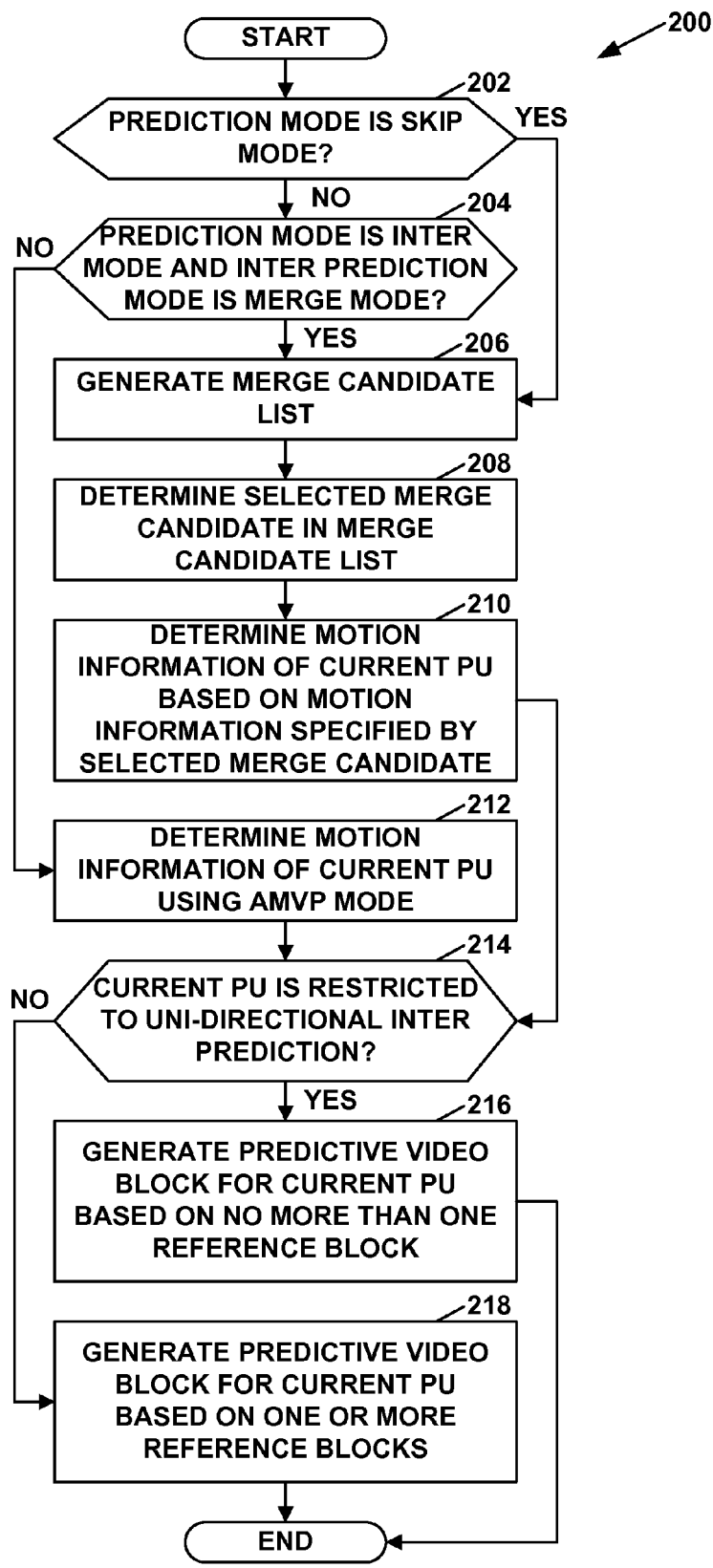
FIG. 4 is a flowchart illustrating an example motion compensation operation.

FIG. 4 is a flowchart that illustrates an example motion compensation operation 200. A video coder, such as video encoder 20 or video decoder 30, may perform motion compensation operation 200. The video coder may perform motion compensation operation 200 to generate a predictive video block for a current PU.

After the video coder starts motion compensation operation 200, the video coder may determine whether the prediction mode for the current PU is skip mode (202). If the prediction mode for the current PU is not skip mode ("NO" of 202), the video coder may determine whether the prediction mode for the current PU is inter mode and that the inter prediction mode of the current PU is merge mode (204). If the prediction mode of the current PU is skip mode ("YES" of 202) or if the prediction mode of the current PU is inter mode and the inter prediction mode of the current PU is merge mode ("YES" of 204), the video coder may generate a merge candidate list for the current PU (206). The merge candidate list may include a plurality of merge candidates. Each of the merge candidates specifies a set of motion information, such as one or more motion vectors, one or more reference picture indexes, a list 0 prediction flag, and a list 1 prediction flag. The merge candidate list may include one or more uni-directional merge candidates or bi-directional merge candidates. In some examples, the video coder may perform the example operation described below with regard to FIG. 6 to generate the merge candidate list.

After generating the merge candidate list, the video coder may determine a selected merge candidate in the merge candidate list (208). If the video coder is a video encoder, the video coder may select a merge candidate from the merge candidate list based on a rate-distortion analysis. If the video coder is a video decoder, the video coder may select the merge candidate based on a syntax element (e.g., merge_idx) that identifies a position of the selected merge candidate in the merge candidate list.

The video coder may then determine the motion information of the current PU based on the motion information specified by the selected merge candidate (210). The motion information may include one or more motion vectors and reference picture indexes. The video coder may determine the motion information of the current PU based on the motion information specified by the selected merge candidate in various ways. For example, the video coder may determine that the motion information of the current PU is the same as the motion information specified by the selected merge candidate.

Figure 8:
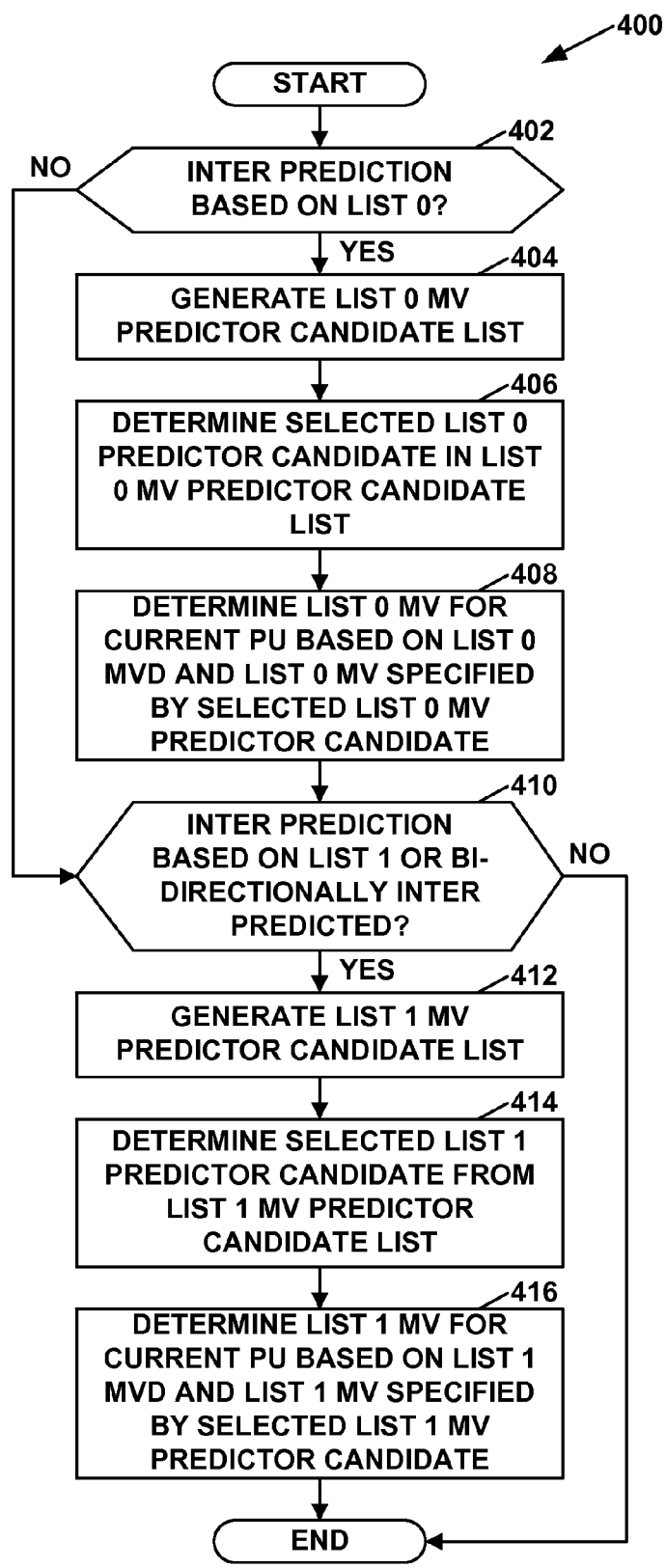
FIG. 8 is a flowchart that illustrates an example operation for determining the motion information of a prediction unit using advanced motion vector prediction mode.

If the inter prediction mode for the current PU is not merge mode ("NO" of 204), the video coder may determine the motion information of the current PU using AMVP mode (212). FIG. 8, described in detail below, is a flowchart that illustrates an example operation for determining the motion information of a PU using AMVP mode.

After determining the motion information of the current PU, the video coder may determine whether the current PU is restricted to uni-directional inter prediction (214). The video coder may determine whether the current PU is restricted to uni-directional inter prediction in various ways. For example, the video coder may determine that the current PU is restricted to uni-directional inter prediction if a size characteristic of the current PU is less than a threshold. In this example, the video coder may determine that the current PU is restricted to uni-directional inter prediction if the size of the PU is 8×4, 4×8, or smaller. In another example, if the video coder is a video decoder, the video decoder may determine based on a syntax element in the received bitstream that the current PU is restricted to uni-directional inter prediction.

In response to determining that the current PU is restricted to uni-directional inter prediction ("YES" of 214), the video coder may generate a predictive video block for the current PU based on no more than one reference block associated with the motion information of the current PU (216). As indicated above, the reference block may be identified by the motion information specified by the selected merge candidate or synthesized from reference samples identified by the motion information specified by the selected merge candidate.

On the other hand, in response to determining that the current PU is not restricted to uni-directional inter prediction ("NO" of 214), the video coder may generate a predictive video block for the current PU based on one or more reference blocks associated with the motion information of the current PU (218). As indicated above, the one or more reference blocks may be identified by the motion information specified by the selected merge candidate and/or synthesized from reference samples identified by the motion information specified by the selected merge candidate.

Figure 5:
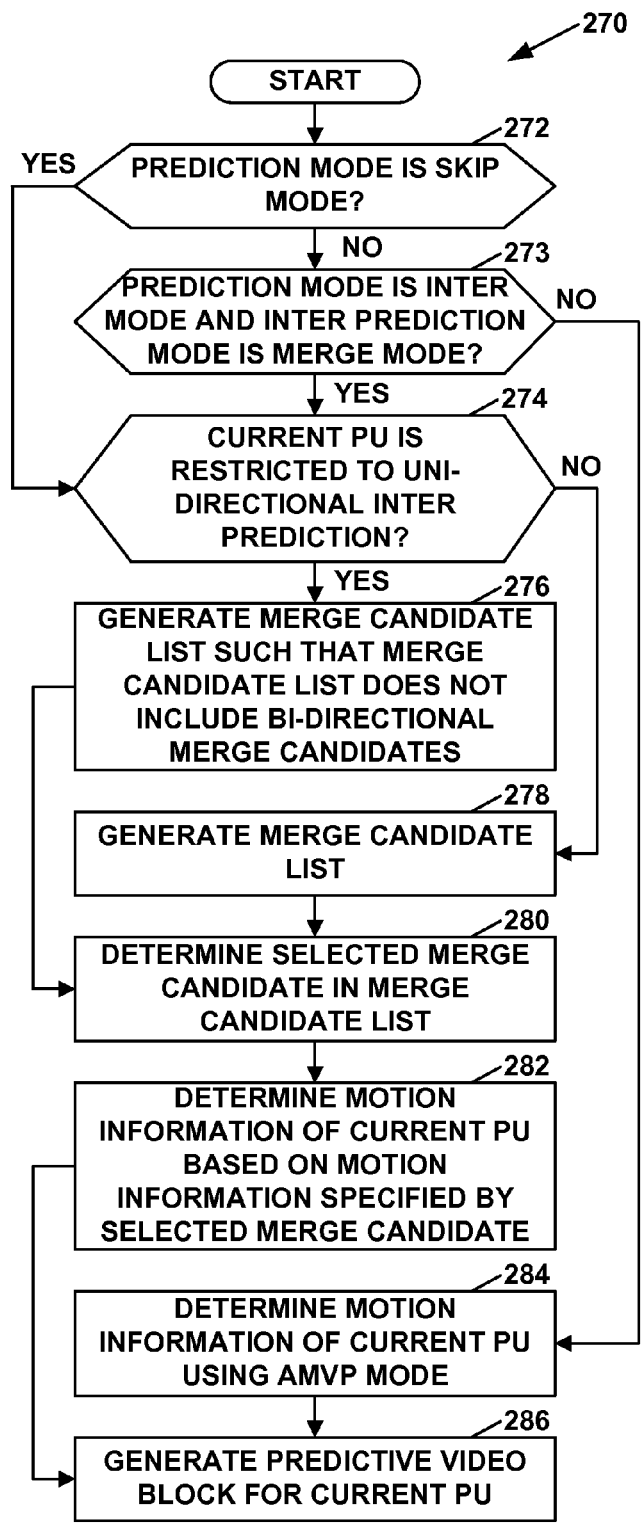
FIG. 5 is a flowchart that illustrates another example motion compensation operation.

FIG. 5 is a flowchart that illustrates another example motion compensation operation 270. A video coder, such as video encoder 20 or video decoder 30, may perform motion compensation operation 270 to generate a predictive video block for a current PU. The video coder may perform motion compensation operation 270 as an alternative to performing motion compensation operation 200.

After the video coder starts motion operation 270, the video coder may determine whether the prediction mode for the current PU is skip mode (272). If the prediction mode for the current PU is not skip mode ("NO" of 272), the video coder may determine whether the prediction mode for the current PU is inter mode and that the inter prediction mode of the current PU is merge mode (273). If the prediction mode of the current PU is skip mode ("YES" of 272) or if the prediction mode of the current PU is inter mode and the inter prediction mode of the current PU is merge mode ("YES" of 273), the video coder may determine whether the current PU is restricted to uni-directional inter prediction (274). If the current PU is restricted to uni-directional inter prediction ("YES" of 274), the video coder may generate a merge candidate list for the current PU such that the merge candidate list does not include bi-directional merge candidates (276). The video coder may use the example operation illustrated in FIG. 6 to generate the merge candidate list for the current PU.

On the other hand, if the current PU is not restricted to uni-directional inter prediction ("NO" of 274), the video coder may generate a merge candidate list that may include uni-directional and bi-directional merge candidates (278). In some examples, the video coder may perform the example operation described below with regard to FIG. 6 to generate the merge candidate list. Hence, if the current PU is not restricted to uni-directional inter prediction, the merge candidate list may include uni-directional merge candidates and bi-directional merge candidates.

After generating the merge candidate list for the current PU, the video coder may determine a selected merge candidate in the merge candidate list (280). If the video coder is a video encoder, the video coder may select a merge candidate from the merge candidate list based on a rate-distortion analysis. If the video coder is a video decoder, the video coder may select the merge candidate based on a syntax element (e.g., merge_idx) that identifies a position of the selected merge candidate in the merge candidate list.

The video coder may then determine the motion information of the current PU based on the motion information specified by the selected merge candidate (282). The motion information specified by the selected merge candidate may specify one or more motion vectors and one or more reference picture indexes. The video coder may determine the motion information of the current PU based on the motion information specified by the selected merge candidate in various ways. For example, the video coder may determine that the motion information of the current PU is the same as the motion information specified by the selected merge candidate.

If the inter prediction mode for the current PU is not merge mode ("NO" of 273), the video coder may determine the motion information of the current PU using AMVP mode (284). FIG. 8, described in detail below, is a flowchart that illustrates an example operation for determining the motion information of a PU using AMVP mode.

After determining the motion information of the current PU, the video coder may generate a predictive video block for the current PU (286). Because the merge candidate list includes only uni-directional merge candidates if the current PU is restricted to uni-directional inter prediction, the selected merge candidate is associated with only a single reference block. Hence, if the current PU is in a B slice and is restricted to uni-directional inter prediction, the predictive video block for the current PU may be based on no more than one reference block associated with the motion information specified by the selected merge candidate.

On the other hand, if the current PU is not restricted to uni-directional inter prediction, the merge candidate list may include uni-directional merge candidates and bi-directional merge candidates. Because the merge candidate list may include uni-directional merge candidates and bi-directional merge candidates, the selected merge candidate may be associated with one or two reference blocks. Hence, if the current PU is in a B slice and is not restricted to uni-directional inter prediction, the predictive video block for the current PU may be based on one or more reference blocks associated with the selected merge candidate.

Figure 6:
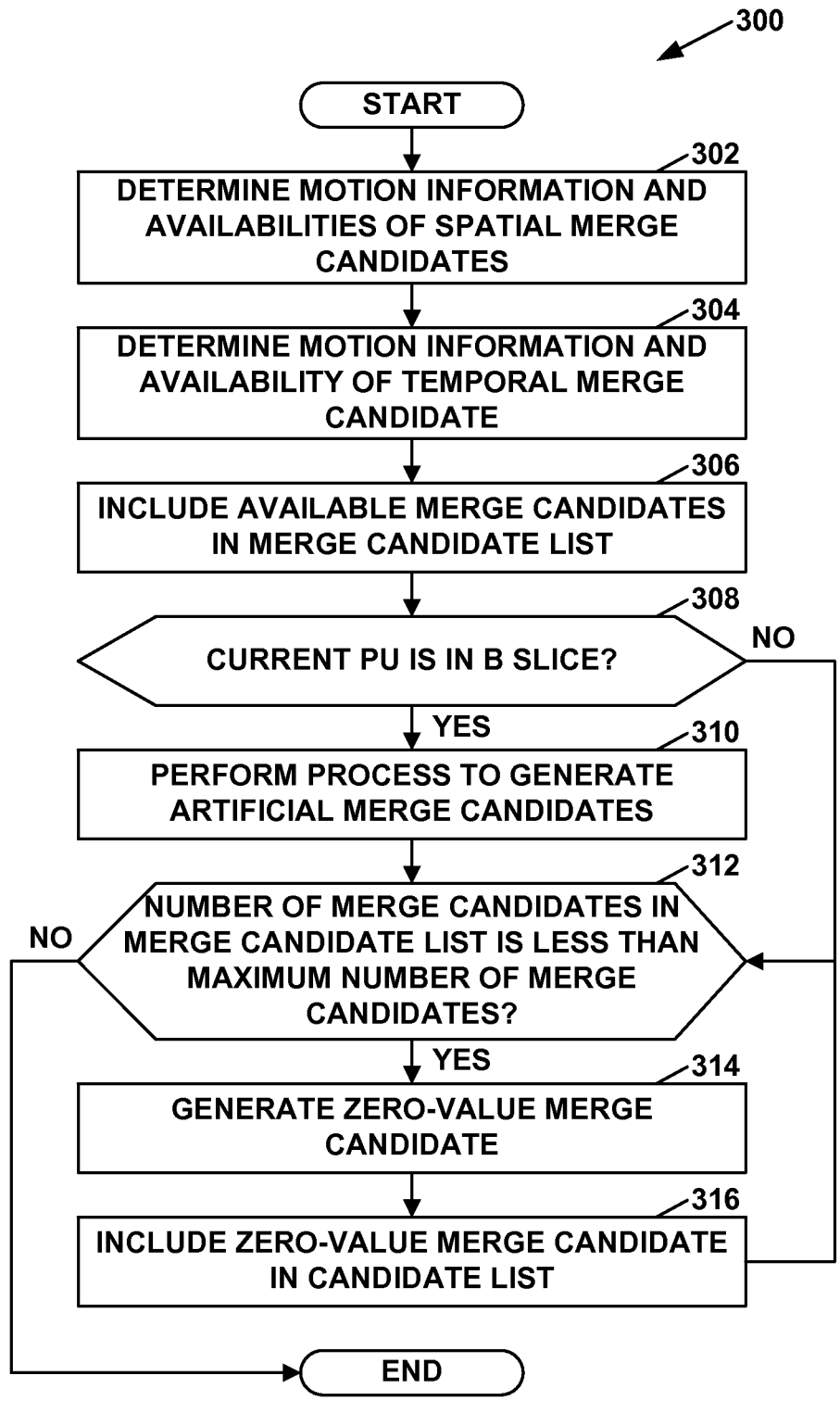
FIG. 6 is a flowchart that illustrates an example operation for generating a merge candidate list.

FIG. 6 is a flowchart that illustrates an example operation 300 for generating a merge candidate list. A video coder, such as video encoder 20 or video decoder 30, may perform operation 300 to generate a merge candidate list for a current PU. The video coder may perform operation 300 when the prediction mode of the current PU is skip mode or when the prediction mode of the current PU is inter mode and the inter prediction mode of the current PU is merge mode.

After the video coder starts operation 300, the video coder may determine motion information and availabilities of spatial merge candidates (302). The video coder may determine the motion information of a spatial merge candidate based on the motion information of a PU that covers a location that spatially neighbors the current PU. For example, the video coder may determine the motion information of the spatial merge candidates based on the motion information of PUs that cover locations left, below-left, above-left, above, and above-right of the current PU.

The video coder may determine the availability of a spatial merge candidate in various ways. For example, the video coder may determine that a spatial merge candidate is unavailable if the spatial merge candidate corresponds to a PU that is intra predicted, located outside the current frame, or located outside the current slice. Furthermore, the video coder may determine that a spatial merge candidate is unavailable if the motion information of the spatial merge candidate is the same as the motion information of another spatial merge candidate.

In addition, the video coder may determine motion information and the availability of a temporal merge candidate (304). The temporal merge candidate may specify the motion information of a PU that is collocated with the current PU, but is in a different picture than the current PU. The video coder may determine the availability of the temporal merge candidate in various ways. For example, the video coder may determine that the temporal merge candidate is unavailable if the temporal merge candidate corresponds to a PU that is intra predicted.

After generating the spatial merge candidates and the temporal merge candidate, the video coder may include available ones of the spatial merge candidates and the temporal merge candidate in the merge candidate list for the current PU (306). The video coder may include a spatial or temporal merge candidate in the merge candidate list if the merge candidate is available and may exclude the merge candidate from the merge candidate list if the merge candidate is unavailable. By excluding unavailable merge candidates from the merge candidate list, the video coder may, in effect, perform a pruning process that prunes (e.g., omits) unavailable merge candidates from the merge candidate list.

In some examples, the video coder generates the merge candidate list such that the merge candidate list only includes uni-directional merge candidates. In some such examples, the video coder may determine that bi-directional merge candidates are unavailable. That is, the video coder may determine that a merge candidate is unavailable if the merge candidate specifies a list 0 motion vector and a list 1 motion vector. Hence, if the current PU is restricted to uni-directional prediction, the video coder may determine that uni-directional merge candidates are available, but not bi-directional merge candidates. Because the video coder may not include unavailable merge candidates in the merge candidate list, the merge candidate list may, in some examples, only include uni-directional merge candidates. In this example, the video coder may, in effect, perform a pruning process that prunes bi-directional merge candidates from the merge list.

In other examples where the video coder generates the merge candidate list such that the merge candidate list only includes uni-directional merge candidates, the video coder may convert bi-directional merge candidates to uni-directional candidates and then include available ones of the uni-directional merge candidates in the merge candidate list. In such examples, the video coder may not add a uni-directional merge candidate to the merge candidate list if the uni-directional merge candidate is the same as a uni-directional merge candidate that is already added to the merge candidate list. In this way, the video coder may prune duplicate uni-directional merge candidates from the merge candidate list. By converting bi-directional merge candidates to uni-directional merge candidates before pruning duplicate uni-directional merge candidates from the merge candidate list, the video coder may be able to avoid redundant merge candidates in the merge candidate list after pruning Converting bi-directional merge candidates to uni-directional merge candidates before pruning duplicate uni-directional merge candidates may increase the hardware complexity of the video coder. In addition, the video coder may convert multiple bi-directional merge candidates that are the same to uni-directional merge candidates.

In other examples, the video coder may initially include available bi-directional merge candidates in the merge candidate list for the current PU. The video coder may then prune duplicate merge candidates from the merge candidate list. After the video coder has generated the merge candidate list, the video coder may determine the selected merge candidate from the merge candidate list and convert the selected merge candidate to a uni-directional merge candidate if the selected merge candidate is a bi-directional merge candidate. In this example, the video coder may effectively convert the selected bi-directional merge candidate to a uni-directional merge candidate by using only the reference block indicated by the list 0 motion vector or the list 1 motion vector to generate the predictive video block for the current PU.

In contrast to converting bi-directional merge candidates to uni-directional merge candidates prior to pruning duplicate merge candidates from the merge candidate list, converting the selected bi-directional merge candidate to a uni-directional merge candidate after pruning duplicate merge candidates from the merge candidate list may only involve a single conversion, as opposed to multiple conversions. For example, if conversion occurs after pruning duplicate merge candidates, the selected merge candidate is the third merge candidate in the merge candidate list, and the third merge candidate is a bi-directional merge candidate, the video coder may only convert the third merge candidate into a uni-directional merge candidate. In this example, if conversion occurs before pruning duplicate merge candidates, the selected merge candidate is the third merge candidate in the merge candidate list, and the third merge candidate is a bi-directional merge candidate, the video coder may have to convert three bi-directional merge candidates before the video coder is able to determine the selected merge candidate due to performing the pruning operation after the conversion.

The video coder may generate different merge candidate lists depending on whether the video coder converts bi-directional merge candidates to uni-directional merge candidates before or after pruning duplicate merge candidates from the merge candidate list. For example, the video coder may convert bi-directional merge candidates to uni-directional merge candidates by taking the list 0 motion vectors of the bi-directional merge candidates and ignoring the list 1 motion vectors of the bi-directional merge candidates. In this example, a first merge candidate may be uni-directional and may specify a list 0 motion vector that is equal to a value MV 1. In this example, a second merge candidate may be bi-directional and may specify a list 0 motion vector that is the equal to MV1 and a list 1 motion vector that is equal to a value MV2. The first and second merge candidates may specify the same list 0 reference picture indexes. In this example, if the video coder converts the second merge candidate to a uni-directional merge candidate before pruning duplicate merge candidates from the merge candidate list, there may be two uni-directional merge candidates that are equal to MV1. Accordingly, the video coder may prune the uni-directional merge candidate generated from the second merge candidate because it is redundant over the first merge candidate. As a result, the video coder may include only one merge candidate (e.g., the first merge candidate) in the merge candidate list.

However, in the example of the previous paragraph, if the video coder converts the second merge candidate to a uni-directional merge candidate after pruning duplicate merge candidates from the merge candidate list, the video coder may include both the first and second merge candidates in the merge candidate list. After including the first and second merge candidates in the merge candidate list, the video coder may convert the second merge candidate into a uni-directional merge candidate by taking (i.e., keeping) the second merge candidate's list 0 motion vector and ignoring the second merge candidate's list 1 motion vector. Thus, the merge candidate list may, in effect, include two merge candidates, both of which specify list 0 motion vectors that are equal to MV1.

Figure 7:
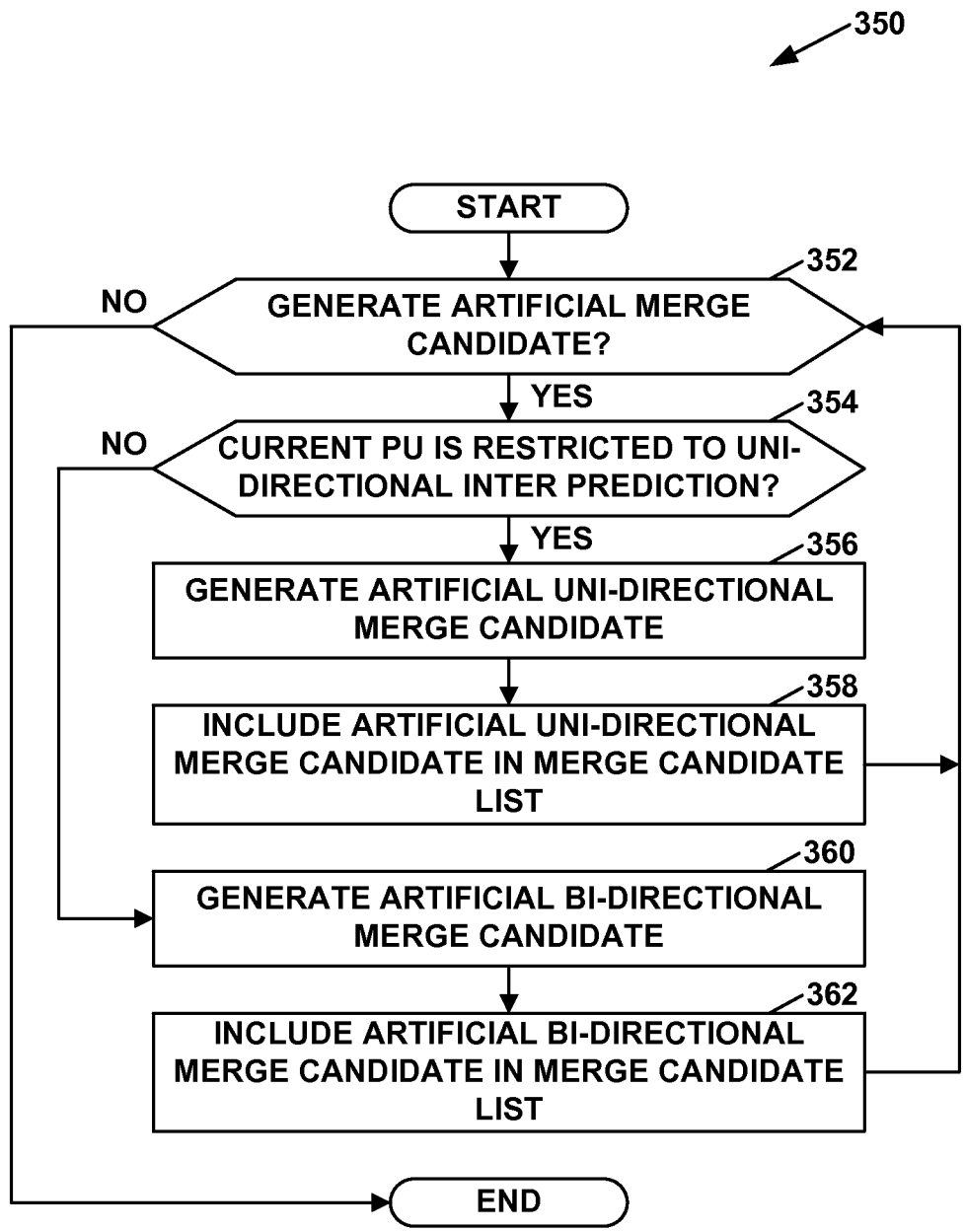
FIG. 7 is a flowchart that illustrates an example process for generating artificial merge candidates.

After including the available merge candidates in the merge candidate list, the video coder may determine whether the current PU is in a B slice (308). In response to determining that the current PU is in a B slice ("YES" of 308), the video coder may perform a process that generates zero or more artificial merge candidates and includes the artificial merge candidates in the merge candidate list (310). FIG. 7, described in detail below, illustrates an example process for generating artificial merge candidates.

In response to determining that the current PU is not in a B slice ("NO" of 308) or after performing the process that generates artificial merge candidates, the video coder may determine whether the number of merge candidates in the merge candidate list is less than the maximum number of merge candidates (312). If the number of merge candidates in the merge candidate list is not less than the maximum number of merge candidates ("NO" of 312), the video coder has finished generating the merge candidate list.

However, in response to determining that the number of merge candidates in the merge candidate list is less than the maximum number of merge candidates ("YES" of 312), the video coder may generate a zero-value merge candidate (314). If the current PU is in a P slice, the zero-value merge candidate may specify a list 0 motion vector that has a magnitude equal to zero. If the current PU is in a B slice and the current PU is not restricted to uni-directional inter prediction, the zero-value merge candidate may specify a list 0 motion vector that has a magnitude equal to zero and a list 1 motion vector that has a magnitude equal to zero. In some examples, the zero-value merge candidate may specify either a list 0 motion vector or a list 1 motion vector that has a magnitude equal to zero if the current PU is in a B slice and the current PU is restricted to uni-directional inter prediction. The video coder may then include the zero-value merge candidate in the merge candidate list (316).

After including the zero-value merge candidate in the merge candidate list, the video coder may again determine whether the number of merge candidates in the merge candidate list is less than the maximum number of merge candidates (312) and, if so, the video coder may generate an additional zero-value merge candidate. In this way, the video coder may continue generating zero-value merge candidates and including the zero-value merge candidates in the merge candidate list until the number of merge candidates in the merge candidate list is equal to the maximum number of merge candidates.

FIG. 7 is a flowchart that illustrates an example process 350 for generating artificial merge candidates. A video coder, such as video encoder 20 or video decoder 30, may perform process 350 to generate artificial merge candidates for inclusion in a merge candidate list for a current PU.

After the video coder starts process 350, the video coder may determine whether to generate an artificial merge candidate (352). The video coder may determine whether to generate an artificial merge candidate in various ways. For example, the video coder may determine whether the number of artificial merge candidates in the merge candidate list is equal to the total number of unique artificial candidates that can be generated based on the original merge candidates in the merge candidate list. The original merge candidates may be merge candidates that specify the motion information of PUs other than the current PU. Furthermore, in this example, the video coder may determine whether the merge candidate list includes a maximum number of merge candidates. In this example, if both of these conditions are false, the video coder may make the determination to generate an artificial merge candidate.

If the video coder makes the determination to generate an artificial merge candidate ("YES" of 352), the video coder may determine whether the current PU is restricted to uni-directional inter prediction (354). As described above, the video coder may determine whether the current PU is restricted to uni-directional inter prediction in various ways. For example, the video coder may determine whether the current PU is restricted to uni-directional inter prediction based on a size characteristic of the current PU. In another example, the video coder may determine whether the current PU is restricted to uni-directional inter prediction based on a parameter indicated in the syntax elements of the current treeblock, current CU or current PU, or in a slice header, a PPS, an APS, an SPS, or in another parameter set. In some examples, a parameter in a treeblock may specify that all PUs associated with the treeblock are restricted to uni-directional inter prediction. In some examples, a parameter in a CU may specify that all PUs associated with the CU are restricted to uni-directional inter prediction. In some examples, a parameter in a PPS may specify that all PUs associated with pictures associated with the PPS are restricted to uni-directional inter prediction. In some examples, a parameter in an APS may specify that all PUs associated with pictures associated with the APS are restricted to uni-directional inter prediction. In some examples, a parameter in a SPS may specify that all PUs associated with pictures in a sequence associated with the SPS are restricted to uni-directional inter prediction.

In response to determining that the current PU is restricted to uni-directional inter prediction ("YES" of 354), the video coder may generate an artificial uni-directional merge candidate (356). After generating the artificial uni-directional merge candidate, the video coder may include the artificial uni-directional merge candidate in the merge candidate list (358). After including the artificial uni-directional merge candidate in the merge candidate list, the video coder may determine whether to generate another artificial merge candidate (352) and, if so, generate another artificial merge candidate.

The video coder may generate the artificial uni-directional merge candidate in various ways. For example, the video coder may generate the artificial uni-directional merge candidate by first taking a pair of uni-directional merge candidates that are already in the candidate list. The first and second uni-directional merge candidates may specify motion vectors MV1 and MV2, respectively. In this example, the video coder may then scale MV2 according to a temporal difference between the reference frame specified by the first uni-directional merge candidate and the reference frame specified by the second uni-directional merge candidate. In this example, video coder may generate an artificial uni-directional merge candidate that specifies the scaled version of MV2. For instance, in this example, the reference picture associated with the first uni-directional merge candidate may occur one picture after the current picture and the reference picture associated with the second uni-directional merge candidate may occur four pictures after the current picture. In this example, the video coder may divide both the horizontal and vertical components of MV2 by four and use this scaled MV2 with the reference picture index corresponding to MV 1 as an artificial candidate. Similar scaling can be performed for MV1 based on MV2.

In another example, the video coder may generate an artificial uni-directional merge candidate that specifies one of the motion vectors specified by a bi-directional merge candidate. For example, a bi-directional merge candidate may specify a list 0 motion vector and a list 1 motion vector. In this example, the video coder may generate an artificial uni-directional merge candidate that specifies the list 0 motion vector, but does not specify the list 1 motion vector. In this example, the video coder may generate another artificial uni-directional merge candidate that specifies the list 1 motion vector, but does not specify the list 0 motion vector. In this way, the video coder may generate uni-directional artificial merge candidates from a bi-directional spatial or temporal merge candidate by splitting the bi-directional merge candidate into two uni-directional merge candidates, one from a list 0 motion vector and another from the list 1 motion vector. The video encoder may include either or both of the uni-directional merge candidates in the merge candidate list. In other words, the video coder may generate an artificial uni-directional merge candidate such that the artificial uni-directional merge candidate specifies a motion vector specified by the bi-directional merge candidate.

In examples where the video coder generates artificial uni-directional merge candidates based on motion vectors specified by bi-directional merge candidates, the video coder may add the artificial uni-directional merge candidates to the merge candidate list according to various orders. For example, the video coder may add an artificial uni-directional merge candidate based on a list 0 motion vector of a first bi-directional merge candidate, then add an artificial uni-directional merge candidate based on a list 1 motion vector of the first bi-directional merge candidate, then add an artificial uni-directional merge candidate based on a list 0 motion vector of a second bi-directional merge candidate, then add an artificial uni-directional merge candidate based on a list 1 motion vector of the second bi-directional merge candidate, and so on.

If the current PU is not restricted to uni-directional inter prediction ("NO" of 354), the video coder may generate an artificial bi-directional merge candidate (360). As mentioned above, the video coder may determine whether the current PU is restricted to uni-directional inter prediction based on various factors, such as a size characteristic of the PU, a parameter, etc. The video coder may generate the artificial bi-directional merge candidate in various ways. For example, the video coder may select a combination of two merge candidates in the merge candidate list. In this example, the video coder may determine whether the first one of the selected merge candidates specifies a reference picture in list 0, whether the second one of the selected merge candidates specifies a reference picture in list 1, and whether the specified reference pictures have different picture order counts. If each of these conditions is true, the video coder may generate an artificial bi-directional merge candidate that specifies the list 0 motion vector of the first merge candidate in the combination and the list 1 motion vector of the second merge candidate in the combination. In some examples, such as the example of FIG. 4, where the merge candidate list may include uni-directional merge candidates and bi-directional merge candidates, process 350 does not include acts 354, 356, and 358. Rather, the video coder may generate artificial bi-directional merge candidates in the merge candidate lists for PUs in B slices.

After generating the artificial bi-directional merge candidate, the video coder may include the artificial bi-directional merge candidate in the merge candidate list for the current PU (362). The video coder may then determine whether to generate another artificial merge candidate (352), and so on.

FIG. 8 is a flowchart that illustrates an example operation 400 for determining the motion information of a PU using AMVP mode. A video coder, such as video encoder 20 or video decoder 30, may perform operation 400 to determine the motion information of a PU using AMVP mode.

After the video coder starts operation 400, the video coder may determine whether inter prediction for the current PU is based on list 0 (402). If inter prediction for the current PU is based on list 0 ("YES" of 402), the video coder may generate a list 0 MV predictor candidate list for the current PU (404). The list 0 MV predictor candidate list may include two list 0 MV predictor candidates. Each of the list 0 MV predictor candidates may specify a list 0 motion vector.

After generating the list 0 MV predictor candidate list, the video coder may determine a selected list 0 MV predictor candidate in the list 0 MV predictor candidate list (406). The video coder may determine the selected list 0 MV predictor candidate based on a list 0 MV predictor flag ("mvp_l0_flag"). The video coder may then determine a list 0 motion vector for the current PU based on the list 0 MVD for the current PU and the list 0 motion vector specified by the selected list 0 MV predictor candidate (408).

Furthermore, after determining that inter prediction for the current PU is not based on list 0 ("NO" of 402) or after determining the list 0 motion vector for the current PU (408), the video coder may determine whether inter prediction for the current PU is based on list 1 or whether the PU is bi-directionally inter predicted (410). If inter prediction for the current PU is not based on list 1 and the current PU is not bi-directionally inter predicted ("NO" of 410), the video coder has finished determining the motion information of the current PU using AMVP mode. In response to determining that inter prediction for the current PU is based on list 1 or the current PU is bi-directionally inter predicted ("YES" of 410), the video coder may generate a list 1 MV predictor candidate list for the current PU (412). The list 1 MV predictor candidate list may include two list 1 MV predictor candidates. Each of the list 0 MV predictor candidates may specify a list 1 motion vector.

After generating the list 1 MV predictor candidate list, the video coder may determine a selected list 1 MV predictor candidate in the list 1 MV predictor candidate list (414). The video coder may determine the selected list 1 MV predictor candidate based on a list 1 MV predictor flag ("mvp_l1_flag"). The video coder may then determine a list 1 motion vector for the current PU based on a list 1 MVD for the current PU and the list 1 motion vector specified by the selected list 1 MV predictor candidate (416).

In some examples, the video coder may not add bi-directional MV predictor candidates to the list 0 and list 1 MV predictor candidate lists. In other words, if a MV predictor candidate specifies a list 0 motion vector and a list 1 motion vector, the video coder may exclude the MV predictor candidate from the list 0 and list 1 MV predictor candidate lists. Rather, the video coder may add only uni-directional MV predictor candidates to the list 0 and list 1 MV predictor candidate lists. The video coder may accomplish this by checking whether each possible and available MV predictor candidate is uni-directional, and only including the uni-directional MV predictor candidates in the MV predictor candidate lists.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware or software units. Rather, as described above, various components, modules, and units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for coding video data, the method comprising:
    determining, based on a size characteristic of a prediction unit (PU) in a B slice of the video data being below a threshold, that the PU is restricted to uni-directional inter prediction;
    generating a merge candidate list for the PU;
    determining a selected merge candidate in the merge candidate list, wherein the selected merge candidate is a bi-directional merge candidate, wherein two different reference blocks are associated with motion information specified by the selected merge candidate; and
    based on the PU being restricted to uni-directional inter prediction, converting the selected merge candidate from being a bi-directional merge candidate to being a uni-directional merge candidate by keeping a list 0 motion vector of the selected merge candidate and ignoring a list 1 motion vector of the selected merge candidate such that a predictive video block for the PU is generated based on no more than one of the two different reference blocks associated with the motion information specified by the selected merge candidate.

2. The method of claim 1, wherein determining that the PU is restricted to uni-directional inter prediction comprises determining, based on a height or a width of a video block associated with the PU being below the threshold, that the PU is restricted to uni-directional inter prediction.

3. The method of claim 1, wherein determining that the PU is restricted to uni-directional inter prediction comprises determining, based on a first dimension of a video block associated with the PU being less than a threshold and a second dimension of the video block associated with the PU being less than or equal to the threshold, that the PU is restricted to uni-directional inter prediction.

4. The method of claim 1, wherein determining that the PU is restricted to uni-directional inter prediction comprises determining, based on a first dimension of a video block associated with the PU being less than a first threshold and a second dimension of the video block associated with the PU being less than a second threshold, that the PU is restricted to uni-directional inter prediction.

5. The method of claim 4, wherein the first threshold is the same as the second threshold.

6. The method of claim 1, wherein determining that the PU is restricted to uni-directional prediction comprises:
    determining, based on a size characteristic of a coding unit (CU) associated with the PU being less than or equal to a particular size and the size characteristic of the PU being below the threshold, that the PU is restricted to uni-directional inter prediction, wherein the size characteristic of the CU is a height or a width of a video block associated with the CU.

7. The method of claim 6, wherein the particular size is equal to eight and the threshold is equal to eight.

8. The method of claim 1, wherein determining the selected merge candidate comprises:
    determining, based on a candidate index value for the PU, the selected merge candidate in the merge candidate list;
    determining motion information of the PU based on the selected merge candidate;
    generating a predictive block for the current PU based on a reference block associated with the list 0 motion vector of the selected merge candidate; and
    using the predictive block for the current PU and residual video blocks associated with transform units of a coding unit (CU) to reconstruct a video block of the CU.

9. The method of claim 1, further comprising generating a bitstream that includes an encoded syntax element that indicates a position in the merge candidate list of the selected merge candidate.

10. The method of claim 1, wherein the method is performed on a mobile computing device.

11. A video coding device that comprises:
    a data storage medium configured to store video data; and
    one or more processors configured to:
        determine, based on a size characteristic of a prediction unit (PU) in a B slice of the video data being below a threshold, that the PU is restricted to uni-directional inter prediction;
        determine that the PU is not restricted to uni-directional inter prediction if the size characteristic of the PU is not below the threshold;
        generate a merge candidate list for the PU;
        determine a selected merge candidate in the merge candidate list, wherein the selected merge candidate is a bi-directional merge candidate and two different reference blocks are associated with motion information specified by the selected merge candidate; and
        based on the PU being restricted to uni-directional inter prediction, convert the selected merge candidate from being a bi-directional merge candidate to being a uni-directional merge candidate by keeping a list 0 motion vector of the selected merge candidate and ignoring a list 1 motion vector of the selected merge candidate such that a predictive video block for the PU is generated based on no more than one of the two different reference blocks associated with the motion information specified by the selected merge candidate.

12. The video coding device of claim 11, wherein the one or more processors are configured to determine, based on a height or a width of a video block associated with the PU being below the threshold, that the PU is restricted to uni-directional inter prediction.

13. The video coding device of claim 11, wherein the one or more processors are configured to determine, based on a first dimension of a video block associated with the PU being less than a threshold and a second dimension of the video block associated with the PU being less than or equal to the threshold, that the PU is restricted to uni-directional inter prediction.

14. The video coding device of claim 11, wherein the one or more processors are configured to determine, based on a first dimension of a video block associated with the PU being less than a first threshold and a second dimension of the video block associated with the PU being less than a second threshold, that the PU is restricted to uni-directional inter prediction.

15. The video coding device of claim 14, wherein the first threshold is the same as the second threshold.

16. The video coding device of claim 11, wherein the one or more processors are configured to:
determine, based on a size characteristic of a coding unit (CU) associated with the PU being less than or equal to a particular size and the size characteristic of the PU being below the threshold, that the PU is restricted to uni-directional inter prediction.

17. The video coding device of claim 16, wherein the particular size is equal to eight and the threshold is equal to eight.

18. The video coding device of claim 11, wherein the video coding device decodes video data and the one or more processors are configured to determine the selected merge candidate based on a syntax element that indicates a position in the merge candidate list of the selected merge candidate.

19. The video coding device of claim 11, wherein the video coding device encodes video data and the one or more processors are configured to output a syntax element that indicates a position in the merge candidate list of the selected merge candidate.

20. The video coding device of claim 11, wherein the video coding device is a mobile computing device comprising at least one of a display configured to display picture data associated with the PU or a camera configured to generate the picture data associated with the PU.

21. A video coding device comprising:
means for determining, based on a size characteristic of a prediction unit (PU) in a B slice of the video data being below a threshold, that the PU is restricted to uni-directional inter prediction;
means for generating a merge candidate list for the PU;
means for determining a selected merge candidate in the merge candidate list, wherein the selected merge candidate is a bi-directional merge candidate, wherein two different reference blocks are associated with motion information specified by the selected merge candidate; and
means for converting, based on the PU being restricted to uni-directional inter prediction, the selected merge candidate to being a uni-directional merge candidate by keeping a list 0 motion vector of the selected merge candidate and ignoring a list 1 motion vector of the selected merge candidate such that a predictive video block for the PU is generated based on no more than one of the two different reference blocks associated with the motion information specified by the selected merge candidate.

22. A non-transitory computer readable storage medium that stores instructions that, when executed, configure one or more processors to:
determine, based on a size characteristic of a prediction unit (PU) in a B slice of the video data being below a threshold, that the PU is restricted to uni-directional inter prediction;
generate a merge candidate list for the PU;
determine a selected merge candidate in the merge candidate list, wherein the selected merge candidate is a bi-directional merge candidate, wherein two different reference blocks are associated with motion information specified by the selected merge candidate; and
based on the PU being restricted to uni-directional inter prediction, convert the selected merge candidate from being a bi-directional merge candidate to being a uni-directional merge candidate by keeping a list 0 motion vector of the selected merge candidate and ignoring a list 1 motion vector of the selected merge candidate such that a predictive video block for the PU is generated based on no more than one of the two different reference blocks associated with the motion information specified by the selected merge candidate.

23. The video coding device of claim 11, further comprising a display configured to display the decoded video data.

24. The video coding device of claim 11, further comprising a camera configured to capture the video data.

* * * * *